(12) United States Patent
Sugiyama et al.

(10) Patent No.: US 9,906,174 B2
(45) Date of Patent: Feb. 27, 2018

(54) POWER STEERING DEVICE AND CONTROL DEVICE FOR POWER STEERING DEVICE

(71) Applicant: HITACHI AUTOMOTIVE SYSTEMS, LTD., Hitachinaka-shi, Ibaraki (JP)

(72) Inventors: Yoshitaka Sugiyama, Machida (JP); Masaki Kashima, Ebina (JP); Hiroyuki Ota, Atsugi (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 0 days.

(21) Appl. No.: 15/125,094

(22) PCT Filed: Mar. 5, 2015

(86) PCT No.: PCT/JP2015/056524
§ 371 (c)(1),
(2) Date: Sep. 9, 2016

(87) PCT Pub. No.: WO2015/141482
PCT Pub. Date: Sep. 24, 2015

(65) Prior Publication Data
US 2017/0025973 A1    Jan. 26, 2017

(30) Foreign Application Priority Data

Mar. 19, 2014   (JP) .................................. 2014-056902

(51) Int. Cl.
*H02P 6/14* (2016.01)
*H02P 6/15* (2016.01)
(Continued)

(52) U.S. Cl.
CPC ................ *H02P 6/15* (2016.02); *B62D 5/046* (2013.01); *H02P 6/085* (2013.01); *H02P 27/085* (2013.01)

(58) Field of Classification Search
CPC ............ H02P 6/15; H02P 6/085; B62D 5/046
(Continued)

(56) References Cited

U.S. PATENT DOCUMENTS

2006/0181819 A1   8/2006  Nomura et al.
2007/0107973 A1*  5/2007  Jiang ...................... B62D 5/046
                                                                180/443
(Continued)

FOREIGN PATENT DOCUMENTS

JP   H05-085392 A    4/1993
JP   2006-211825     8/2006
(Continued)

OTHER PUBLICATIONS

International Search Report issued in related International Patent Application No. PCT/JP2015/056524, completed May 25, 2015.

*Primary Examiner* — Erick Glass
(74) *Attorney, Agent, or Firm* — Foley & Lardner LLP

(57) ABSTRACT

Provided are a power steering device and a control device for a power steering device, which are capable of reducing power consumption. The power steering device includes a current detection number setting circuit configured to set the number of times of detection of a DC bus current value by a current detecting circuit to a first predetermined number over a first predetermined cycle of a PWM period when the steering-state signal indicative of a steering operation state is received, and to set the number of times of detection so that the number of times of detection becomes smaller than the first predetermined number over the first predetermined cycle of the PWM period when a steering-state signal indicative of a non-steered state is received.

26 Claims, 9 Drawing Sheets

(51) Int. Cl.
*H02P 27/08* (2006.01)
*H02P 6/08* (2016.01)
*B62D 5/04* (2006.01)

(58) Field of Classification Search
USPC .................................................. 318/400.01
See application file for complete search history.

(56) References Cited

U.S. PATENT DOCUMENTS

2009/0192665 A1* 7/2009 Nozawa ............... B62D 5/0472
 701/31.4
2014/0077733 A1* 3/2014 Kashima ................. H02P 27/00
 318/400.2

FOREIGN PATENT DOCUMENTS

| JP | 2006-246601 A | 9/2006 |
| JP | 2011-066990 A | 3/2011 |
| JP | 4866216 B2 | 11/2011 |
| JP | 2012-228155 A | 11/2012 |

* cited by examiner (a) DURING NORMAL OPERATION (b) IN CASE OF ABNORMALITY

POWER STEERING DEVICE AND CONTROL DEVICE FOR POWER STEERING DEVICE

TECHNICAL FIELD

The present invention relates to a power steering device and a control device for a power steering device.

BACKGROUND ART

In a power steering device configured to perform PWM control on a three-phase brushless motor to apply a steering force to a steering mechanism, a command current value to the three-phase brushless motor is subjected to feedback correction based on three-phase current values (phase current values). In a one-shunt current detection method, in order to obtain the three-phase current values, a bus current value between a bridge circuit configured to control drive of the three-phase brushless motor and a DC power supply is detected by a single current sensor so that the three-phase current values are reproduced from the DC bus current value. At this time, when PWM pulse widths of two phases are close to each other or the same as each other, it becomes difficult to sample the DC bus current value. As a result, the current value of each of the phases cannot be reproduced.

Therefore, in Patent Literature 1, there is disclosed a technology of performing a so-called pulse shift for shifting switch timings of the respective phases to prevent the two PWM pulse widths from being closer to each other.

CITATION LIST

Patent Literature

PTL 1: JP 4866216 B2

SUMMARY OF INVENTION

Technical Problem

When the pulse shift is performed, a potential difference is instantaneously generated between the phases to generate a harmonic current. Thus, as compared to a case where the pulse shift is not performed, the DC bus current is increased by the amount of the harmonic current, leading to increase in power consumption. Therefore, there is a need to reduce the power consumption in the above-mentioned related-art device.

It is an object of the present invention to provide a power steering device and a control device for a power steering device capable of reducing power consumption.

Solution to Problem

In the present invention, the number of times of detection of a DC bus current value is set to a first predetermined number over a first predetermined cycle of a PWM period when a steering-state signal indicative of a steering operation state is received, whereas the number of times of detection of the DC bus current value is set so as to be smaller than the first predetermined number over the first predetermined cycle of the PWM period when the steering-state signal indicative of a non-steered state is received.

DESCRIPTION OF EMBODIMENTS

First Embodiment

[Power Steering Device]

Figure 1:
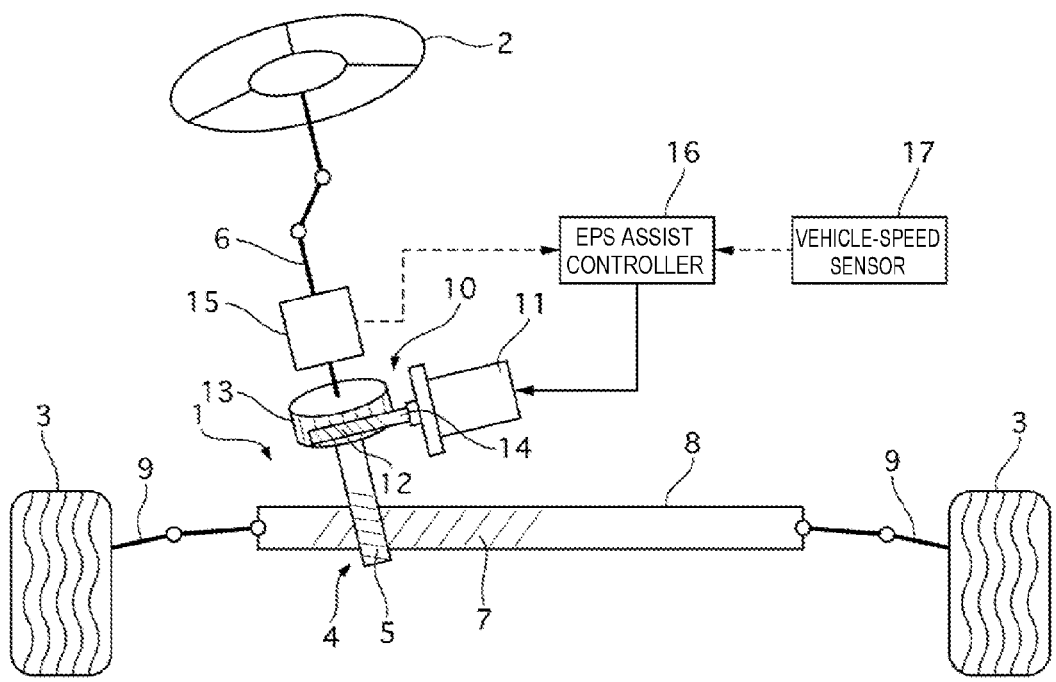
FIG. 1 is a configuration diagram of an electric power steering device according to a first embodiment of the present invention.

FIG. 1 is a configuration diagram of an electric power steering device according to a first embodiment of the present invention.

A steering mechanism 1 is configured to steer front wheels (steered wheels) 3, 3 along with rotation of a steering wheel 2, and includes a rack and pinion type steering gear 4. A pinion gear 5 of the steering gear 4 is coupled to the steering wheel 2 through intermediation of a steering shaft 6. A rack gear 7 of the steering gear 4 is provided on a rack shaft 8. Both ends of the rack shaft 8 are respectively coupled to the front wheels 3, 3 through tie rods 9, 9. A three-phase brushless motor (hereinafter referred to as "motor") 11 is coupled to the steering shaft 6 through intermediation of a speed reducer 10. The speed reducer 10 includes a worm 12 and a worm wheel 13. The worm 12 is provided integrally with a motor shaft 14 of the motor 11. A rotational torque from the motor shaft 14 is transmitted to the steering shaft 6 through intermediation of the speed reducer 10. A torque sensor 15 configured to detect a steering torque value is provided on the steering shaft 6. An EPS assist controller 16 is configured to control a driving current of the motor 11 based on the steering torque value and a vehicle speed detected by a vehicle-speed sensor 17 so as to apply a steering force for assisting steering performed by a driver to the steering mechanism 1.

[Motor Control Circuit]

Figure 2:
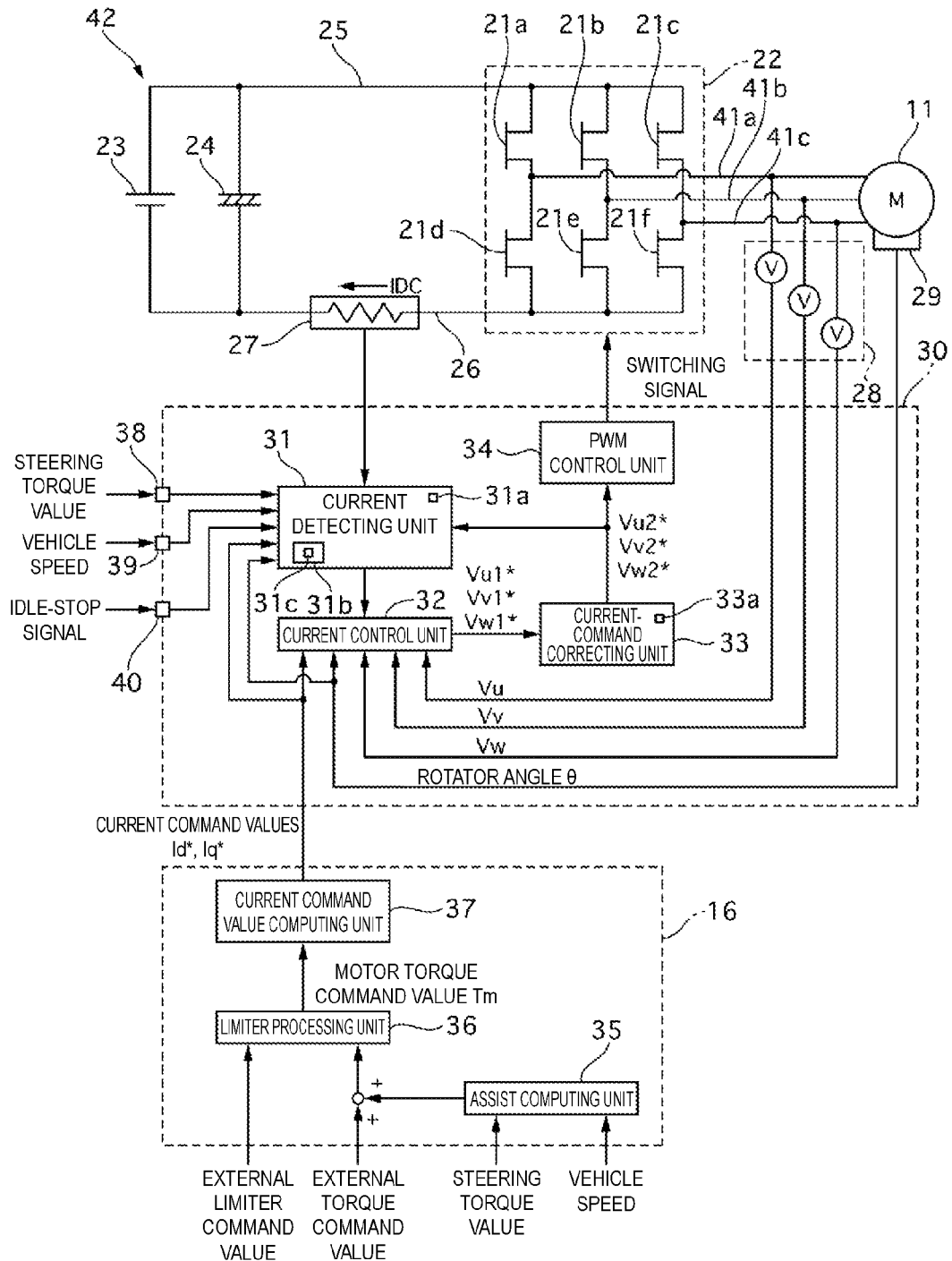
FIG. 2 is a control configuration diagram of a three-phase brushless motor 11 according to the first embodiment.

FIG. 2 is a control configuration diagram of the three-phase brushless motor 11.

The motor 11 is connected to a DC power supply 23 and a smoothing capacitor 24 arranged in parallel to the DC power supply 23 through a three-phase bridge circuit 22 including six field-effect transistors (FETs) 21*a*, 21*b*, 21*c*, 21*d*, 21*e*, and 21*f* as a switching circuit. A shunt resistor (current sensor) 27 configured to detect a downstream-side DC bus current value IDC is provided on, among two DC buses 25 and 26 for connecting the smoothing capacitor 24 and the three-phase bridge circuit 22, the downstream-side DC bus 26 for connecting a downstream side (negative side) of the smoothing capacitor 24 and a downstream side of the three-phase bridge circuit 22. A phase-voltage sensor (voltage monitor) 28 configured to detect phase-voltage values (Vu, Vv, Vw) of three phases (U-phase, V-phase, W-phase) is provided on conductive wires 41*a*, 41*b*, and 41*c* for connecting the three-phase bridge circuit 22 and the motor 11. A rotation-angle sensor 29 configured to detect a rotator angle θ is provided on the motor 11. The three-phase bridge circuit 22, the DC power supply 23, the smoothing capacitor 24, the DC buses 25, and 26, and the conductive wires 41*a*, 41*b*, and 41*c* construct a motor driving circuit 42.

A motor controller 30 generates switching signals (PWM duty signals) based on current command values Id* and Iq* from the EPS assist controller 16 and outputs the switching signals to the three-phase bridge circuit 22. The three-phase bridge circuit 22 controls each of the FETs 21*a*, 21*b*, 21*c*, 21*d*, 21*e*, and 21*f* based on the switching signals. The motor controller 30 includes a current detecting unit 31, a current control unit 32, a voltage-command correcting unit 33, and a PWM control unit 34.

Through input of the downstream-side DC bus current value (hereinafter referred to as "DC bus current value") IDC flowing through the shunt resistor 27, the current detecting unit (phase-current computing unit) 31 reproduces (estimates) phase-current values Iu, Iv, and Iw flowing in the three phases. The current detecting unit 31 includes a current detecting circuit 31*a* configured to detect, through the shunt resistor 27, the DC bus current value IDC when, among the switching signals, the switching signal of a maximum phase with the longest energization time is ON and the switching signal of a minimum phase with the shortest energization time and the switching signal of an intermediate phase are OFF, and the DC bus current value IDC when, among the switching signals, the switching signal of the maximum phase is ON and the switching signal of the intermediate phase is ON.

Through input of the reproduced phase-current values Iu, Iv, and Iw and the current command values Id* and Iq*, the current control unit (current feedback circuit) 32 outputs first three-phase voltage command values Vu1*, Vv1*, and Vw1* in accordance with the rotator angle θ.

The voltage-command correcting unit 33 outputs second voltage command values Vu2*, Vv2*, and Vw2* obtained by correcting the first three-phase voltage command values Vu1*, Vv1*, and Vw1* so that the DC bus current value IDC can be detected by the shunt resistor 27. A method of correcting the first three-phase voltage command values Vu1*, Vv1*, and Vw1* is described later.

Through input of the second voltage command values Vu2*, Vv2*, and Vw2*, a triangle-wave carrier signal, and a voltage value VDC of the DC power supply 23, the PWM control unit 34 generates the switching signals for each preset prescribed PWM period and outputs the switching signals to the three-phase bridge circuit 22. The computation of the first three-phase command values Vu1*, Vv1*, and Vw1* by the current control unit 32 and the computation of the second voltage command values Vu2*, Vv2*, and Vw2* by the voltage command correcting unit 33 are performed in a period two times larger than the PWM period. Specifically, a current control period of the motor 11 is two times larger than the PWM period.

Here, The downstream-side DC bus current value IDC flowing through the shunt resistor 27 is such that an AC voltage is generated from the DC power supply 23 by switching of the three-phase bridge circuit 22 so that phase currents of the three phases flow through the motor 11, and an instantaneous current flows through the shunt resistor 27 due to an instantaneous voltage generated by a difference between switching timings of the three-phase bridge circuit 22. The current detecting unit 31 determines which of the three phases the IDC is a current of by observing each of the switching timings based on the second voltage command values Vu2*, Vv2*, and Vw2* and the IDC at the time so as to derive the phase current values of the three phases from the value of the IDC.

The EPS assist controller 16 includes an assist computing unit 35, a limiter processing unit 36, and a current-command computing unit 37.

The assist computing unit 35 computes an assist torque command value based on the steering torque value detected by the torque sensor 15 and the vehicle speed detected by the vehicle-speed sensor 17. The assist torque command value has a characteristic of increasing as the steering torque value increases and increasing as the vehicle speed decreases.

The limiter processing unit 36 applies a restriction with an external limiter command value to a value obtained by adding the assist torque command value and an external torque command value, thereby computing a motor torque command value Tm. The external torque command value and the external limiter command value are input from an external controller through a CAN communication line. As the external controller, for example, an LDP controller, a parking assist controller, and the like can be given. The LDP controller is configured to generate the external torque command value for making the steering performed by the driver lighter when the driver is steering in such a direction as to return an own vehicle inside a lane in a case where the own vehicle tends to deviate from the lane. Meanwhile, when the driver is steering in a lane deviation direction, the external limit value for making the steering performed by the driver heavier is generated. The parking assist controller is configured to generate a parking trajectory for parking the own vehicle at a predetermined parking position and generates the external torque command value for steering the front wheels 3, 3 so that the own vehicle runs along the parking trajectory.

The current command computing unit (command current computing unit) 37 computes the current command values Id* and Iq* based on the motor torque command value Tm.

The motor driving circuit 42 and the motor controller 30 are provided integrally with the motor 11. Meanwhile, the EPS assist controller 16 is arranged in a vehicle so as to be separated away from the motor 11.

The EPS assist controller 16, the motor controller 30, and the motor driving circuit 42 construct a control device configured to control drive of the three-phase brushless motor 11.

[Pulse Shift Control]

Figure 3:
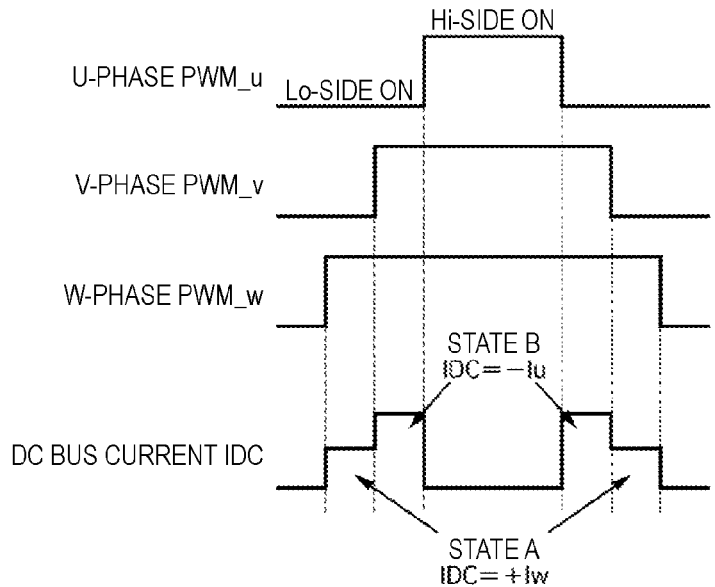
FIG. 3 is a chart for illustrating a method of reproducing three-phase current values based on a DC bus current value IDC.

FIG. 3 is a chart for illustrating a method of reproducing the three-phase current values from the DC bus current.

At PWM switching timings PWM_u, PWM_v, and PWM_w of the respective phases, which are obtained from the three-phase voltage command values, three-phase currents can be reproduced by using shifts in Hi-side FET switching timing/Lo-side FET switching timing between the phases. For example, in a state A illustrated in FIG. 3, a Hi-side FET of the W-phase is ON, whereas Lo-side FETs of the U-phase and the W-phase are ON. Therefore, the IDC can be regarded as being equivalent to the W-phase current value Iw. Similarly, in a state B, Hi-side FETs of the V-phase and the W-phase are ON, whereas the Lo-side FET of the U-phase is ON. Therefore, by inverting a sign, the value of the IDC can be regarded as being equivalent to the U-phase current value Iu. A value of a sum of the three-phase currents becomes 0 [A]. Therefore, the V-phase current value Iv can be obtained by Expression (1).

$$Iv = -Iu - Iw \quad (1)$$

Here, at steering non-steered time at which the driver is not steering the steering wheel 2, a state is such that the command current Id* and Iq* are small and a motor rpm ω is close to 0. The motor rpm ω can be obtained from a change rate of the rotator angle θ. At this time, as illustrated in FIG. 4(a), PWM duty values and the switching timings are approximately the same in the respective phases. Hence, the current cannot be detected by the method described above. Therefore, in the first embodiment, a so-called pulse shift for arbitrarily shifting the switching timings of the respective phases is performed in the voltage-command correcting unit 33 as illustrated in FIG. 4(b), thereby enabling the current detection.

The voltage-command correcting unit 33 includes a pulse shift control circuit 33a configured to perform the pulse shift control. The pulse shift control circuit 33a is configured to correct the phase of an ON timing of the switching signal of the maximum phase or the intermediate phase so that a difference between an ON timing of the switching signal of the maximum phase and an ON timing of the switching signal of the intermediate phase becomes equal to or larger than a second predetermined value that is larger than a first predetermined value when a difference between the ON timing of the switching signal of the maximum phase and the ON timing of the switching signal of the intermediate phase becomes smaller than the first predetermined value, and to correct the phase of the switching signal of the intermediate phase or the minimum phase so that a difference between the ON timing of the switching signal of the intermediate phase and the ON timing of the switching signal of the minimum phase becomes equal to or larger than the second predetermined value when the difference between the ON timing of the switching signal of the intermediate phase and the ON timing of the switching signal of the minimum phase becomes smaller than the first predetermined value. Here, the first predetermined value is an upper limit value of the difference between the ON timings, at which sampling of the DC bus current value IDC becomes difficult, resulting in a failure to reproduce the phase current values. The second predetermined value is a lower limit value of the difference between the ON timings, at which the sampling of the DC bus current value IDC is possible to enable the reproduction of the phase current values.

[Setting of Number of Times of Current Detection in Accordance with Scene]

Figure 4:
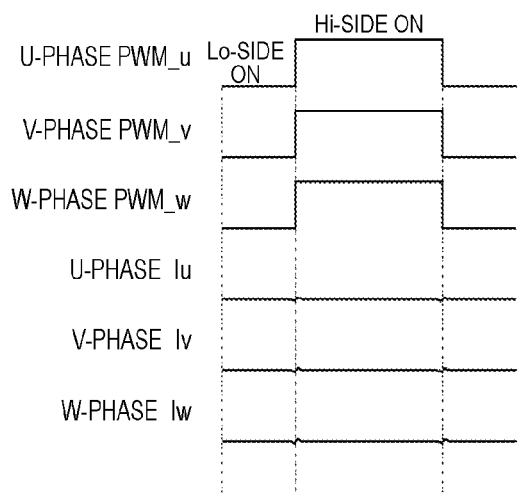
FIG. 4 are charts for illustrating PWM switching timings and phase current values when a motor is not driven (when a current is controlled to 0 [A]).
Figure 4:
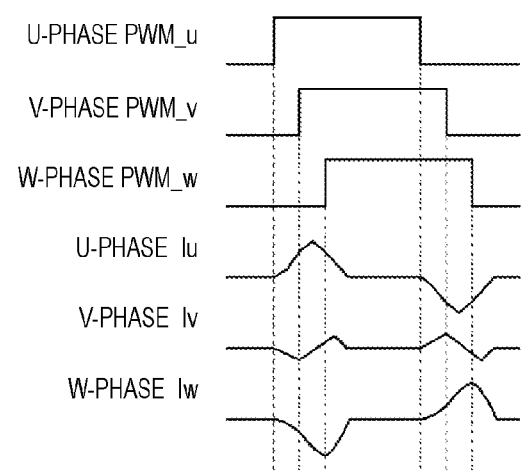

FIG. 4 are illustrations of the respective phase current values Iu, Iv, and Iw along with the PWM switching timings. As illustrated in FIG. 4(a), when the pulse shift is not performed, the current scarcely flows in each of the phases. Meanwhile, as illustrated in FIG. 4(b), when the pulse shift is performed, a voltage difference is instantaneously generated between the phases. Therefore, a harmonic current is generated. The harmonic current flowing in each of the phases corresponds to the amount of increase in the DC bus current value IDC, and hence power consumption increases as compared to the case where the pulse shift is not performed.

Therefore, in the first embodiment, aiming at lowering a frequency of generation of the harmonic current flowing in each of the phases to reduce the power consumption, the number of times of detection of the current for the DC bus current value IDC per given time (hereinafter abbreviated simply as "current detection number") is changed in accordance with a scene. The current detecting unit 31 includes a current detection number setting circuit 31b configured to set the current detection number in accordance with the scene.

The pulse shift control circuit 33a is configured to change the number of times of execution of the pulse shift control in accordance with the current detection number set in the current detection number setting circuit 31b. Specifically, the pulse shift control circuit 33a performs the pulse shift control when the detection of the DC bus current value IDC is implemented by the current detecting unit 31, and does not perform the pulse shift control when the detection of the DC bus current value IDC is not implemented.

The motor controller 30 includes a steering signal receiving unit 38, a vehicle-speed signal receiving unit 39, and an idle-stop signal receiving unit 40. The steering signal receiving unit 38 receives a steering torque value signal detected by the torque sensor 15. The vehicle-speed signal receiving unit 39 receives the vehicle-speed signal detected by the vehicle-speed sensor 17. The idle-stop signal receiving unit 40 receives an idle-stop signal output from an idle stop controller (not shown). The idle stop controller is configured to execute so-called idle stop control for automatically stopping an engine when predetermined engine stop conditions are satisfied and restarting the engine when predetermined engine restart conditions are satisfied. The idle stop controller outputs the idle stop signal indicating that the vehicle is currently in an idle stop state during the execution of the idle stop control.

The current detection number setting circuit 31b includes a steering-state determining circuit 31c configured to determine a steering steered state and a steering non-steered state based on the steering torque value, the motor rpm ω, and the current command values Id* and Iq*. When the steering steered state is determined, the current detection number setting circuit 31b sets the number of times of detection of the DC bus current value IDC to one (first predetermined number) over two cycles (first predetermined cycle) of the PWM period. Meanwhile, when the steering non-steered state is determined, the number of times of detection of the DC bus current value IDC is set to one over six cycles of the PWM period.

Further, the current detection number setting circuit 31b sets the number of times of detection so that the number of times of detection becomes smaller as the vehicle speed is lower. More specifically, the number of times of detection is set to one over two cycles of the PWM period at an intermediate vehicle speed and a high vehicle speed, and is set to one over four cycles of the PWM period at a low vehicle speed. Running at the intermediate and high speed and running at the low speed are determined based on a predetermined threshold value. In the case of the steering non-steered state, the number of times of detection is set to one over six cycles of the PWM period regardless of the vehicle speed.

Further, when the idle-stop signal receiving unit 40 receives the idle stop signal, the current detection number setting circuit 31b sets the number of times of detection to one over six cycles of the PWM period regardless of the result of determination by the steering-state determining circuit 31c.

When the result of determination made by the steering-state determining circuit 31c is changed from the steering non-steered state to the steering steered state, the current control unit 32 computes the first three-phase voltage command values Vu1*, Vv1*, and Vw1* based on the latest value of the DC bus current value IDC, which is already detected by the current detecting unit 31.

[Processing of Setting Current Detection Frequency and Pulse Shift Frequency in Accordance with Steering State]

Figure 5:
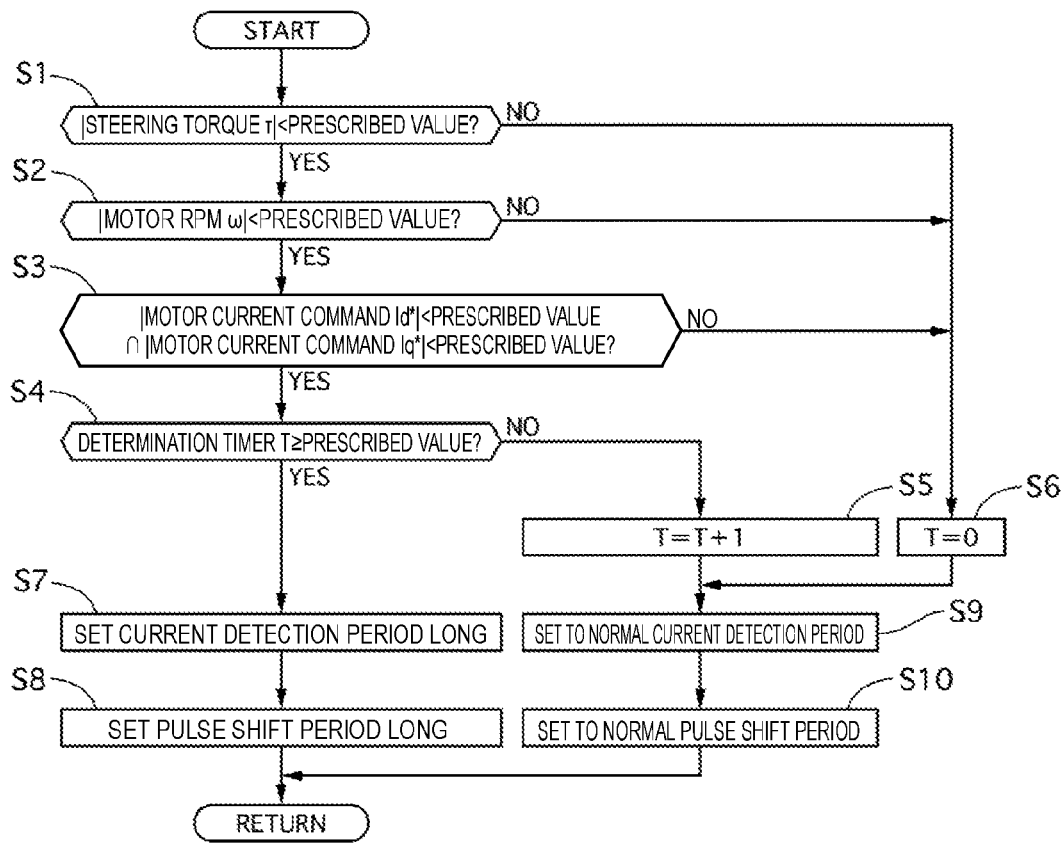
FIG. 5 is a flowchart for illustrating a flow of processing of setting a current detection frequency and a pulse shift frequency in accordance with a steering state, which is executed by a motor controller 30 according to the first embodiment.

FIG. 5 is a flowchart for illustrating a flow of processing of setting a current detection frequency and a pulse shift frequency in accordance with the steering state, which is executed by the motor controller 30. Each of steps is described below.

In Step S1, it is determined in the steering-state determining circuit 31c whether or not an absolute value of a steering torque value T is smaller than a prescribed value. When a result is YES, the processing proceeds to Step S2. When the result is NO, the processing proceeds to Step S6. The prescribed value is a maximum value of the steering torque, based on which it is determined that the driver is not performing a steering operation of the steering wheel 2, and is set to a value in the vicinity of 0.

In Step S2, it is determined in the steering-state determining circuit 31c whether or not an absolute value of the motor rpm ω is smaller than a prescribed value. When a result is YES, the processing proceeds to Step S3. When the result is NO, the processing proceeds to Step S6. The prescribed value is a maximum value of the motor rpm, based on which it is determined that the driver is not performing the steering operation of the steering wheel 2, and is set to a value in the vicinity of 0.

In Step S3, it is determined in the steering-state determining circuit 31c whether or not absolute values of the current command values Id* and Iq* are both smaller than a prescribed value. When a result is YES, the processing proceeds to Step S4. When the result is NO, the processing proceeds to Step S6. The prescribed value is a maximum value of the current command value, based on which it is determined that the driver is not performing the steering operation of the steering wheel 2 and control is not performed by the external controller, and is set to a value in the vicinity of 0.

In Step S4, it is determined in the steering-state determining circuit 31c whether or not a determination timer T is equal to or larger than a prescribed value. When a result is YES, the processing proceeds to Step S7. When the result is NO, the processing proceeds to Step S5. The prescribed value is set to a value (time) based on which it is determined that the motor 11 is not driven and the driver has no intention to perform the steering.

In Step S5, the determination timer T is incremented (+1) in the steering-state determining circuit 31c.

In Step S6, the determination timer T is reset (=0) in the steering-state determining circuit 31c.

In Step S7, a current detection period for the DC bus current value IDC is set long in the current detection number setting circuit 31b. Specifically, the number of times of detection of the DC bus current value IDC is set to one over six cycles of the PWM period.

In Step S8, a period of the pulse shift control (pulse shift period) is set long in the voltage-command correcting unit 33. Specifically, the number of times of the pulse shift control is set to one over six cycles of the PWM period. At this time, the current is detected once over three cycles of the current control period of the motor 11, and hence the DC bus current value IDC is updated once over three cycles of the current control period.

In Step S9, the current detection period for the DC bus current value IDC is set to a period during a normal operation in the current detection number setting circuit 31b. Specifically, the number of times of detection of the DC bus current value IDC is set to one over two cycles of the PWM period.

In Step S10, the pulse shift period is set to a period during the normal operation in the voltage-command correction unit 33. Specifically, the number of times of pulse shift control is set to one over two cycles of the PWM period.

Next, functions are described.

[Regarding Increase in Power Consumption Along with Pulse Shift Control]

Hitherto, a device configured to read each phase current from a pulsed current waveform flowing in the DC bus current has been used for purposes of cost reduction achieved by reducing the number of components of a current detector and reduction of a fluctuation in torque output, which is caused due to an error between current detectors. When the PWM switching timings between the phases are adjacent to each other, energization time of the pulsed current waveform becomes short, and hence it becomes more difficult to detect the current. Therefore, the pulse shift control for shifting the PWM switching timings between the phases so as to ensure the energization time is secured. In the related-art pulse shift control, however, the pulse shift control is performed in the same period regardless of the driving state of the motor to detect the phase currents.

In a state in which the output current is in the vicinity of 0 [A] and the rotation of the motor is generally stopped, PWM duties of the respective phases are generally the same. Therefore, the switching timings of the respective phases are generally the same when the pulse shift control is not executed. Meanwhile, when the pulse shift control is performed, the switching timings differ between the phases. Therefore, even when the duty values are the same, a voltage difference is generated between the phases, resulting in flow of the harmonic current in each of the phases. A current fluctuation amount ΔI is the harmonic wave, and therefore is expressed as Expression (2) below with an inter-phase inductance L and an inter-phase voltage change amount ΔV.

$$\Delta I = \int \Delta V dt / L \quad (2)$$

Due to the generation of the harmonic current, the power consumption is increased as compared to a case where the pulse shift control is not performed although the steering wheel is not steered. As a result, there is a problem in, for example, an increased load on a battery during idle stop.

[Function of Reducing Current Detection Number when Steering Wheel is not Steered]

Figure 6:
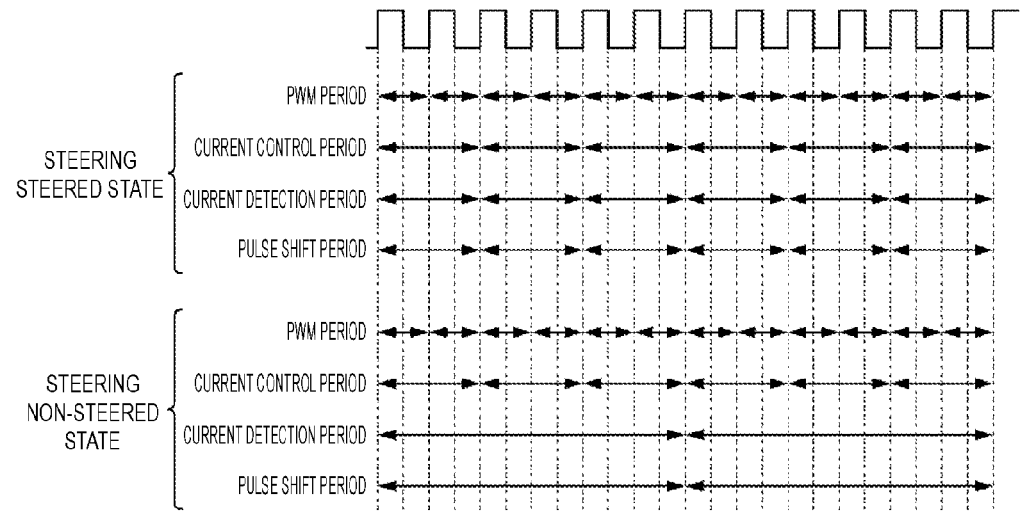
FIG. 6 is a time chart for illustrating a current detection number setting function in accordance with the steering state according to the first embodiment.

To solve this, in the first embodiment, in the current detection number setting circuit 31b, the number of times of detection of the DC bus current value IDC by the current detecting circuit 31a is set to one over two cycles of the PWM period in the steering steered state, whereas the number of times of detection is set to one over six cycles of the PWM period in the steering non-steered state, as illustrated in FIG. 6. In this manner, the number of times of execution of the pulse shift control is one over two cycles of the PWM period in the steering steered state, and is one over six cycles of the PWM period in the steering non-steered state. In the steering non-steered state, the steering force is not required to be applied. In such a state, the duty values of the respective phases of the PWM become closer to each other, resulting in a need of the pulse shift control. Along with the pulse shift control, however, the current disadvantageously flows to consume the power. Meanwhile, in the steering non-steered state, highly accurate motor control is not required. Therefore, the power consumption along with the pulse shift control can be reduced by reducing the current detection number. Even in the steering non-steered state, the current detection is performed. Therefore, even in a case of an abnormality in the current output due to an electrical failure, an output abnormality can be determined from the current detection values to prevent safety from being impaired.

[Function of Synchronizing Current Detection and Pulse Shift]

The pulse shift control circuit 33a performs the pulse shift control when the detection of the DC bus current value IDC is executed by the current detecting unit 31, and does not perform the pulse shift control when the detection of the DC bus current value IDC is not executed. The pulse shift control is performed so as to reproduce the phase current values from the DC bus current value IDC. Therefore, the pulse shift control is performed as needed at least when the DC bus current value IDC is detected, thereby enabling the detection of the DC bus current value IDC with high accuracy. Further, when the DC bus current value IDC is not detected, the pulse shift control is not performed, thereby enabling the reduction of the power consumption.

[Improvement of Control Responsiveness at Start of Steering]

When the result of determination by the steering-state determining circuit 31c is changed from the steering non-steered state to the steering steered state, the current control unit 32 computes the first three-phase voltage command values Vu1*, Vv1*, and Vw1* based on the latest value of the DC bus current value IDC that is already detected by the current detecting unit 31. Specifically, feedback correction is performed using the current values of the u-, v-, and w-phases reproduced from the DC bus current value IDC that is already detected, without waiting for next detection. Thus, responsiveness at restart of the motor control can be enhanced. As a result, deterioration of a steering feel at the start of steering can be suppressed.

The current detection number setting circuit 31b sets the number of times of detection of the DC bus current value IDC to one over six cycles of the PWM period when a state, in which the absolute value of the steering torque value T is smaller than the prescribed value, the absolute value of the motor rpm w is smaller than the prescribed value, and the absolute values of the current command values Id* and Iq* are both smaller than the prescribed value, continues until the determination timer T becomes equal to or larger than the prescribed value. In this manner, an erroneous determination for erroneously determining the steering non-steered state due to sensor noise or the like although the driver is performing the steering operation of the steering wheel 2 can be made less likely to occur. Meanwhile, when the absolute value of the steering torque value T is equal to or larger than the prescribed value, the number of times of detection is immediately set to one over two cycles of the PWM period without any interval. Specifically, when the driver starts the steering operation, the frequency of detection of the DC bus current value IDC is returned early to a frequency of detection during the normal operation. In this manner, a delay in application of an appropriate steering force with respect to a rise of the steering torque value T can be made less likely to occur.

[Reduction of Current Detection Number at Low Vehicle Speed]

The current detection number setting circuit 31b sets the current detection number in accordance with the vehicle speed. Through setting of the current detection number in accordance with the vehicle speed, keeping of the steering feeling and the reduction of the power consumption can be both achieved.

Figure 7:
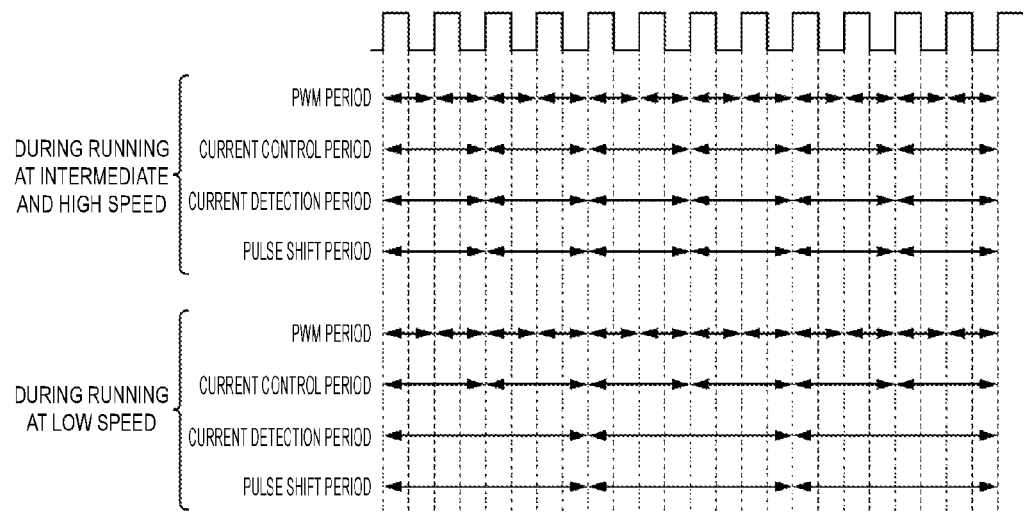
FIG. 7 is a time chart for illustrating the current detection number setting function in accordance with a vehicle speed according to the first embodiment.

As illustrated in FIG. 7, the current detection number setting circuit 31b sets the current detection number to one over two cycles of the PWM period at the intermediate and high vehicle speed, and sets the current detection number to one over four cycles of the PWM period at the low vehicle speed. In this manner, the pulse shift control is performed once over the two cycles of the PWM period at the intermediate and high vehicle speed and once over the four cycles of the PWM period at the low vehicle speed. When the current detection number is reduced, the steering force is not appropriately applied, resulting in a risk of deterioration of the steering feel. Here, the steering torque required to steer the steering wheel 2 is small at the intermediate and high vehicle speed. Therefore, it becomes easier for the driver to obtain the steering feel. Meanwhile, the steering torque required to steer the steering wheel 2 increases at the low vehicle speed. Therefore, it becomes more difficult for the driver to obtain the steering feel. In particular, when the vehicle speed is 0 km/h, it is most difficult to obtain the steering feel. Therefore, the number of times of detection of the DC bus current value IDC is set smaller as the vehicle speed is lower. As a result, the power consumption can be reduced at the low vehicle speed while the steering feel at the intermediate and high vehicle speed is kept.

[Function of Determining Steering Non-Steered State]

The steering-state determining circuit 31c determines the steering non-steered state based on the steering torque value T, the motor rpm ω, and the current command values Id* and Iq*. When the driver does not perform the steering operation of the steering wheel 2, the absolute value of the steering torque value T becomes smaller than the prescribed value. Further, the current command values Id* and Iq* are generated in accordance with the steering torque value T. Therefore, when the absolute values of the current command values Id* and Iq* are smaller than the prescribed value, it is determined that the driver is in a non-steering state. Similarly, when the motor rpm ω is smaller than the prescribed value, the motor 11 is not rotating. Therefore, it is determined that the driver is in a non-steering state. Thus, through determination of the steering non-steered state based on the steering torque value T, the motor rpm ω, and the current command values Id* and Iq*, the driver being in the non-steering state can be detected with high accuracy.

Further, when the absolute value of the motor rpm ω is smaller than the prescribed value or the absolute values of the current command values Id* and Iq* are smaller than the prescribed value, it is determined that the motor 11 is not controlled by the external controller. If the current detection number is reduced during the motor control performed by the external controller even when the driver is in the non-steering state, there is a risk of reduction of control accuracy. Thus, when the motor rpm ω is equal to or larger than the prescribed value or the current command values Id* and Iq* are equal to or larger than the prescribed values, the steering steered state is determined to set the current detection number to that during the normal operation. In this manner, the reduction of accuracy of the motor control performed by the external controller can be suppressed.

[Function of Determining Steering Steered State]

The steering-state determining circuit 31c determines the steering steered state based on the steering torque value T. When the driver starts the steering operation of the steering wheel 2, the steering torque value T first rises. Subsequently, the current command values Id* and Iq* are determined in accordance with the steering torque value T. Therefore, when the steering steered state is determined after the current command values Id* and Iq* are considered, a delay is generated with respect to the steering operation performed by the driver. Thus, the detection frequency of the DC bus current value IDC cannot be returned early to the detection frequency during the normal operation. Meanwhile, through determination of the steering steered state in view of the steering torque value T, the steering-wheel steered state can be determined early.

[Reduction of Current Detection Number During Idle Stop]

When the idle-stop signal receiving unit 40 receives the idle stop signal, the current detection number setting circuit 31b sets the number of times of detection of the DC bus current value IDC to one over six cycles of the PWM period. During the idle stop of the vehicle, the vehicle is in a stopped state and there is a high possibility that the steering operation is not performed. Further, during the idle stop, the engine is stopped. Therefore, power is not generated by an alternator. Thus, through reduction of the number of times of detection of the DC bus current value IDC during the idle stop, the power consumption can be reduced during the idle stop.

In a case where the idle stop signal is received, the current detection number setting circuit 31b sets the number of times of detection of the DC bus current value IDC to one over six cycles of the PWM period even when the steering steered state is determined by the steering-state determining circuit 31c. Even when the driver performs the steering operation of the steering wheel 2, there is a high possibility that the vehicle is stopped during the idle stop. Thus, it is difficult for the driver to obtain the steering feel. Therefore, through prioritization of the reduction of the number of times of detection of the DC bus current value IDC during the idle stop, battery power consumption can be reduced.

In the first embodiment, effects listed below are achieved.

(1) There is provided a power steering device, including: the steering mechanism 1 configured to steer the steered wheels 3, 3 in accordance with a steering operation of the steering wheel 2; the three-phase brushless motor 11 configured to apply a steering force to the steering mechanism 1; the control device (the EPS assist controller 16, the motor controller 30, and the motor driving circuit 42) configured to control drive of the three-phase brushless motor 11; the current command computing unit 37 provided in the EPS assist controller 16, configured to compute the current command values Id* and Iq* to the three-phase brushless motor 11 based on an operating state of a vehicle; the PWM control unit 34 provided in the motor controller 30, configured to output the switching signals respectively to a u-phase, a v-phase, and a w-phase of the three-phase brushless motor 11 in accordance with the current command values Id* and Iq*; the three-phase bridge circuit 22 provided in the motor driving circuit 42, the three-phase bridge circuit 22 being constructed of six FETs 21a, 21b, 21c, 21d, 21e, and 21f whose drive is to be controlled by the switching signals, and being configured to control the drive of the three-phase brushless motor 11; the shunt resistor 27 provided to the DC bus 26 connected to the three-phase bridge circuit 22, and configured to detect the DC bus current value IDC flowing through the DC bus 26; the current detecting circuit 31a provided in the motor controller 30, and configured to detect, through the shunt resistor 27, the DC bus current value IDC when, among the switching signals to the u-phase, the v-phase, and the w-phase of the three-phase brushless motor 11, the switching of a maximum phase with longest energization time is ON and the switching of a minimum phase with shortest energization time and the switching signal of an intermediate phase are OFF, and the DC bus current value IDC when, among the switching signals to the u-phase, the v-phase, and the w-phase of the three-phase brushless motor 11, the switching signal of the maximum phase is ON and the switching signal of the intermediate phase is ON; the current detecting unit 31 configured to estimate current values of the u-phase, the v-phase, and the w-phase based on the DC bus current value IDC detected by the shunt resistor 27; the current control unit 32 provided in the motor controller 30, and configured to perform feedback correction on the current command value Id* and Iq* based on the current values of the u-phase, the v-phase, and the w-phase, which are estimated by the current detecting unit 31; the pulse shift control circuit 33a provided in the motor controller 30, and configured to correct a phase of an ON timing of the switching signal of the maximum phase or the intermediate phase so that a difference between an ON timing of the switching signal of the maximum phase and an ON timing of the switching signal of the intermediate phase becomes equal to or larger than a second predetermined value larger than a first predetermined value when the difference between the ON timing of the switching signal of the maximum phase and the ON timing of the switching signal of the intermediate phase becomes smaller than the first predetermined value, and to correct a phase of the switching signal of the intermediate phase or the minimum phase so that a difference between the ON timing of the switching signal of the intermediate phase and an ON timing of the switching signal of the minimum phase becomes equal to or larger than the second predetermined value when the difference between the ON timing of the switching signal of the intermediate phase and the ON timing of the switching signal of the minimum phase becomes smaller than the first predetermined value; the steering-signal receiving unit 38 provided in the motor controller 30, and configured to receive the steering torque value T of the steering wheel 2; and the current detection number setting circuit 31b provided in the motor controller 30, and configured to set the number of times of detection of the DC bus current value IDC by the current detecting circuit 31a to one over two cycles of a PWM period when the steering-signal receiving unit 38 receives the steering torque value T indicative of a steering steered state, and to set the number of times of detection so that the number of times of detection becomes smaller than one over the two cycles of the PWM period (one time over six cycles of the PWM period) when the steering-signal receiving unit 38 receives the steering torque value T indicative of the steering non-steered state.

Thus, the power consumption along with the pulse shift control can be reduced in the steering non-steered state while the motor control with high accuracy in the steering steered state is maintained.

(2) The pulse shift control circuit 33*a* is configured to perform the pulse shift control when the detection of the DC bus current value IDC is executed by the current detecting circuit 31*a*.

Thus, the DC bus current value IDC can be detected with high accuracy.

(3) The motor controller 30 includes the vehicle-speed receiving unit 39 configured to receive a vehicle-speed signal. The current detection number setting circuit 31*b* is configured to change the number of times of detection in accordance with the vehicle-speed signal.

Thus, the keeping of the steering feeling and the reduction of the power consumption can be both achieved.

(4) There is provided a control device for a power steering device (the EPS assist controller 16, the motor controller 30, and the motor driving circuit 42), configured to control drive of the three-phase brushless motor 11 configured to apply a steering force to the steering mechanism 1, the control device including: the current command computing unit 37 configured to compute current command values Id* and Iq* to the three-phase brushless motor 11 based on an operating state of a vehicle; the PWM control unit 34 configured to output switching signals respectively to a u-phase, a v-phase, and a w-phase of the three-phase brushless motor 11 in accordance with the current command values Id* and Iq*; the three-phase bridge circuit 22 constructed of six FETs 21*a*, 21*b*, 21*c*, 21*d*, 21*e*, and 21*f* whose drive is to be controlled by the switching signals, and configured to control the drive of the three-phase brushless motor 11; the shunt resistor 27 provided to the DC bus 26 connected to the three-phase bridge circuit 22, and configured to detect the DC bus current value IDC flowing through the DC bus 26; the current detecting circuit 31*a* configured to detect, through the shunt resistor 27, the DC bus current value IDC when, among the switching signals to the u-phase, the v-phase, and the w-phase of the three-phase brushless motor 11, the switching signal of a maximum phase with longest energization time is ON and the switching signal of a minimum phase with shortest energization time and the switching signal of an intermediate phase are OFF, and the DC bus current value IDC when, among the switching signals to the u-phase, the v-phase, and the w-phase of the three-phase brushless motor 11, the switching signal of the maximum phase is ON and the switching signal of the intermediate phase is ON; the current detecting unit 31 configured to estimate current values of the u-phase, the v-phase, and the w-phase based on the DC bus current value IDC detected by the shunt resistor 27; the current control unit 32 configured to perform feedback correction on the current command values Id* and Iq* based on the current values of the u-phase, the v-phase, and the w-phase, which are estimated by the current detecting unit 31; the pulse shift control circuit 33*a* configured to correct a phase of an ON timing of the switching signal of the maximum phase or the intermediate phase so that a difference between an ON timing of the switching signal of the maximum phase and an ON timing of the switching signal of the intermediate phase becomes equal to or larger than a second predetermined value larger than a first predetermined value when the difference between the ON timing of the switching signal of the maximum phase and the ON timing of the switching signal of the intermediate phase becomes smaller than the first predetermined value, and to correct a phase of the switching signal of the intermediate phase or the minimum phase so that a difference between the ON timing of the switching signal of the intermediate phase and an ON timing of the switching signal of the minimum phase becomes equal to or larger than the second predetermined value when the difference between the ON timing of the switching signal of the intermediate phase and the ON timing of the switching signal of the minimum phase becomes smaller than the first predetermined value; the steering-signal receiving unit 38 configured to receive the steering torque value T of the steering wheel 2; and the current detection number setting circuit 31*b* provided in the motor controller 30, and configured to set the number of times of detection of the DC bus current value IDC by the current detecting circuit 31*a* to one over two cycles of a PWM period when the steering-signal receiving unit 38 receives the steering torque value T indicative of a steering operation state, and to set the number of times of detection so that the number of times of detection becomes smaller than one over the two cycles of the PWM period when the steering-signal receiving unit 38 receives the steering torque value T indicative of a steering non-steered state.

Thus, the power consumption along with the pulse shift control can be reduced in the steering non-steered state while the motor control with high accuracy in the steering steered state is maintained.

(5) The pulse shift control circuit 33*a* is configured to avoid performing the pulse shift control when the detection of the DC bus current value IDC is not executed by the current detecting circuit 31*a*.

Thus, the reduction of the power consumption can be achieved.

(6) The current control unit 32 is configured to, when the steering-state signal changes from the steering non-steered state to the steering steered state, perform the feedback control on the current command values Id* and Iq* by using a latest value of the DC bus current value IDC detected by the current detecting circuit 31*a*.

Thus, the responsiveness of the restart of the motor control can be enhanced, thereby enabling suppression of the deterioration of the steering feel at the start of steering.

(7) The current detection number setting circuit 31*b* is configured to change the number of times of detection so that the number of times of detection of the DC bus current value IDC becomes smaller as the vehicle-speed signal represents a lower vehicle speed.

Thus, the reduction of the power consumption can be achieved at the low vehicle speed while the steering feel at the high vehicle speed is kept.

(8) The current detection number setting circuit 31*b* sets the number of times of detection of the DC bus current value IDC so as to be smaller than one over two cycles of the PWM period (to one over four cycles of the PWM period) when a vehicle-speed signal represents 0 km/h.

Thus, the power consumption can be reduced while the steering feeling obtained when the vehicle speed exceeds 0 km/h, namely, when the vehicle is running, is kept.

(9) The current detection number setting circuit 31*b* is configured to set the number of times of detection of the DC bus current value IDC so that the number of times of detection becomes smaller than one over two cycles of the PWM period when the steering-signal receiving unit 38 receives the steering torque value T indicative of the steering non-steered state continuously for predetermined time, and to set the number of times of detection to one over the two cycles of the PWM period when the steering-signal receiving unit 38 receives the steering torque value T indicative of the steering steered state. In this manner, an erroneous determination for erroneously determining the steering non-steered state can be made less likely to occur. Further, a delay in application of an appropriate steering force with respect to a rise of the steering torque value T can be made less likely to occur.

(10) The current detection number setting circuit 31b includes the steering-state determining circuit 31c configured to determine whether or not the steering wheel is in the steering non-steered state, and is configured to set the number of times of detection of the DC bus current value IDC to one over two cycles of the PWM period when the steering-state determining circuit 31c determines the steering steered state based on the steering torque value T, and to set the number of times of detection so that the number of times of detection becomes smaller than one over the two cycles of the PWM period when the steering-state determining circuit 31b determines the steering non-steered state. The steering-state determining circuit 31c is configured to determine that the steering wheel is in the steering non-steered state based on the steering torque value T generated in the steering mechanism 1, the motor rpm ω, or the current command values Id* and Iq*.

Thus, the driver being in the non-steering state and a state in which control is not performed through the external controller can be detected with high accuracy.

(11) The current detection number setting circuit 31b includes the steering-state determining circuit 31c configured to determine whether the steering wheel is in the steering operation state or a steering non-steered state, and is configured to set the number of times of detection of the DC bus current value IDC to one over the two cycles of the PWM period when the steering-state determining circuit 31c determines the steering steered state based on the steering torque value T, and to set the number of times of detection so that the number of times of detection becomes smaller than one over the two cycles of the PWM period when the steering-state determining circuit 31c determines the steering non-steered state. The steering-state determining circuit 31c is configured to determine that the steering wheel is in the steering steered state based on the steering torque value T generated in the steering mechanism 1.

Therefore, the steering steered state can be determined early.

(12) The motor controller 30 includes the idle-stop signal receiving unit 40 configured to receive an idle stop signal indicating that the vehicle is in an idle stop state. The current detection number setting circuit 31b is configured to set the number of times of detection of the DC bus current value IDC so that the number of times of detection becomes smaller than one over two cycles of the PWM period when the idle-stop signal receiving unit 40 receives the idle stop signal.

Therefore, the power consumption can be reduced during the idle stop.

(13) The current detection number setting circuit 31b is configured to, when the idle-stop signal receiving unit 40 receives the idle stop signal and the steering-signal receiving unit 38 receives the steering torque value T indicative of the steering steered state, set the number of times of detection of the DC bus current value IDC so that the number of times of detection becomes smaller than one over two cycles of the PWM period.

Thus, the reduction of battery power consumption can be achieved.

Second Embodiment

A second embodiment of the present invention differs from the first embodiment in the method of setting the number of times of detection of the DC bus current value IDC in accordance with the vehicle-speed signal. Further, the second embodiment differs from the first embodiment in the method of computing the first three-phase voltage command values Vu1*, Vv1*, and Vw1* when the steering non-steered state changes to the steering steered state. The remaining configuration is the same as that of the first embodiment, and therefore the illustration and description thereof are herein omitted.

Figure 8:
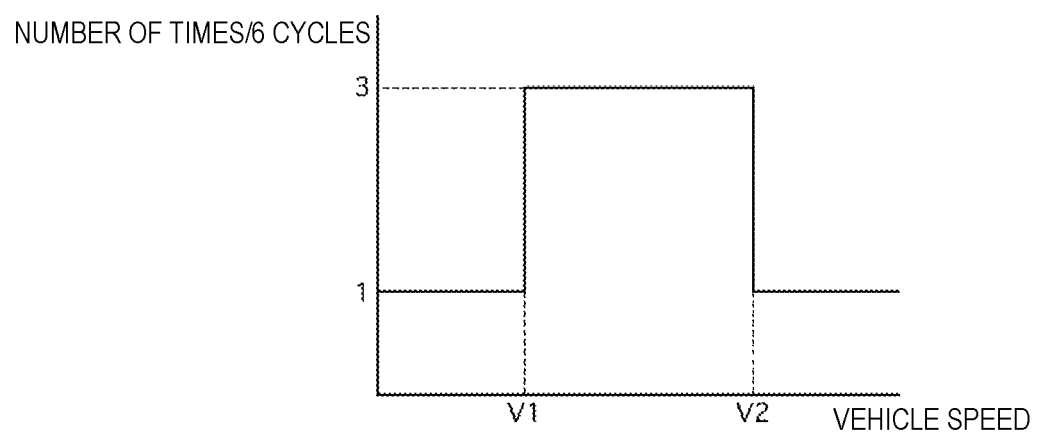
FIG. 8 is a current detection number setting map with respect to the vehicle speed according to a second embodiment of the present invention.

The current detection number setting circuit 31b sets the number of times of detection of the DC bus current value IDC based on a current detection number setting map of FIG. 8 with respect to the vehicle speed. In FIG. 8, when the vehicle speed is present between a first predetermined vehicle speed V1 and a second predetermined vehicle speed V2 (>V1), the number of times of detection is set to three over six cycles of the PWM period, namely, to one over two cycles of the PWM period. Meanwhile, when the vehicle speed is lower than the first predetermined vehicle speed V1 and when the vehicle speed is higher than the second predetermined vehicle speed V2, the number of times of detection is set to one over six cycles of the PWM period. The first predetermined vehicle speed V1 is set to, for example, a vehicle speed during a traffic jam (in the vicinity of 10 km/h). The second predetermined vehicle speed V2 is set to, for example, the lowest speed on an expressway. In the steering non-steered state, the number of times of detection is set to one over six cycles of the PWM period regardless of the vehicle speed.

When the steering-signal receiving unit 38 detects the change from the steering torque value T indicative of the steering non-steered state to the steering torque value T indicative of the steering steered state, specifically, the absolute value of the steering torque value T changes from a state of being smaller than the prescribed value to a state of being equal to or larger than the prescribed value, the current control unit 32 performs the feedback correction on the current command values Id* and Iq* based on the DC bus current value IDC detected by the current detecting circuit 31a after the current command values Id* and Iq* are computed by the current command computing unit 37 subsequent to the change, thereby computing the first three-phase voltage command values Vu1*, Vv1*, and Vw1*.

Next, functions are described.

[Reduction of Current Detection Number at Low Vehicle Speed and High Vehicle Speed]

The current detection number setting circuit 31b sets the number of times of detection of the DC bus current value IDC to one over six cycles of the PWM period at the low vehicle speed and the high vehicle speed. At the low vehicle speed and while the vehicle is stopped, the steering feel is difficult to be obtained. Further, at the high vehicle speed, a rate of application of the steering force by the motor 11 becomes smaller. Thus, through reduction of the current detection number in such a situation, the power consumption can be reduced at the low vehicle speed and the high vehicle speed while the steering feel at the intermediate vehicle speed at which the steering feel is most easily obtained is kept.

[Improvement of Control Accuracy at Start of Steering]

When the steering-signal receiving unit 38 detects the change from the steering torque value T indicative of the steering non-steered state to the steering torque value T indicative of the steering steered state, namely, when the result of determination by the steering-state determining circuit 31c is changed from the steering non-steered state to the steering steered state, the current control unit 32 computes the first three-phase voltage command values Vu1*, Vv1*, and Vw1* based on the DC bus current value IDC detected by the current detecting circuit 31a after the current command values Id* and Iq* are computed subsequent to the change. The feedback correction of the current command values Id* and Iq* is performed on the current command values Id* and Iq*. Therefore, through the feedback correction after the current command values Id* and Iq* are computed, the feedback correction can be performed based on the latest DC bus current value IDC. As a result, the control accuracy at the restart of the motor control can be enhanced, thereby enabling suppression of the deterioration of the steering feel at the start of the steering. Similarly to the first embodiment, when the result of determination by the steering-state determining circuit 31c is changed from the steering non-steered state to the steering steered state, the current control unit 32 may compute the first three-phase voltage command values Vu1*, Vv1*, and Vw1* based on the latest value of the DC bus current value IDC that is already detected by the current detecting unit 31. In this case, the responsiveness at the restart of the motor control can be enhanced, thereby enabling suppression of the deterioration of the steering feel at the start of the steering.

In the second embodiment, effects listed below are achieved in addition to the effects (1) to (5) and (9) to (13) of the first embodiment.

(14) The current detection number setting circuit 31b performs setting so that the number of times of detection of the DC bus current value IDC is smaller than one over two cycles of the PWM period when the vehicle-speed signal is lower than the first predetermined vehicle speed V1 and is higher than the second predetermined vehicle speed V2 higher than the first predetermined vehicle speed V1.

Thus, the power consumption at the low vehicle speed and the high vehicle speed can be reduced while the steering feel at the intermediate vehicle speed at which the steering feel is most easily obtained is kept.

(15) When the steering-signal receiving unit 38 detects the change from the steering torque value T indicative of the steering non-steered state to the steering torque value T indicative of the steering steered state, the current control unit 32 performs the feedback correction on the current command values Id* and Iq* based on the DC bus current value IDC detected by the current detecting unit 31a after the current command values Id* and Iq* are computed subsequent to the change.

Thus, the feedback correction can be performed based on the latest DC bus current value IDC, thereby enabling suppression of the deterioration of the steering feel at the start of steering.

Third Embodiment

A third embodiment of the present invention differs from the first embodiment in that time of the PWM period is extended in the steering non-steered state so as to reduce the number of times of detection of the DC bus current value IDC. The remaining configuration is the same as that of the first embodiment, and therefore illustration and description thereof are herein omitted.

When the change from the steering steered state to the steering non-steered state is detected by the steering-state determining circuit 31c, the current detection number setting circuit 31b outputs to the PWM control unit 34 a PWM period change request for extending the time of the PWM period so that the time of the PWM period becomes three times longer than preset prescribed time. Meanwhile, when the change from the steering non-steered state to the steering steered state is detected by the steering-state determining circuit 31c, the current detection number setting circuit 31b outputs the PWM period change request for setting the time of the PWM period back to the prescribed time again. In the third embodiment, the number of times of detection of the DC bus current value IDC and the number of times of execution of the pulse shift control are set to one over two cycles of the PWM period regardless of the steering steered state or the steering non-steered state.

The PWM control unit 34 changes the time of the PWM period in accordance with the PWM period change request from the current detection number setting circuit 31b. Specifically, the PWM period is set to the prescribed time in the steering steered state, whereas the PWM period is set to the time three times longer than the prescribed time in the steering non-steered state.

Next, functions are described.

[Function of Reducing Current Detection Number when Steering Wheel is not Steered]

Figure 9:
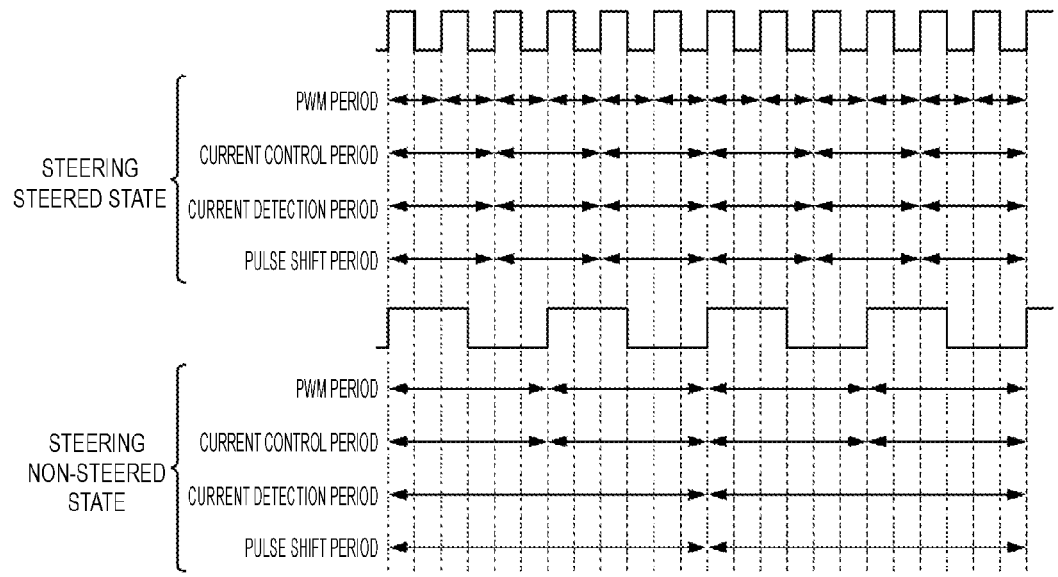
FIG. 9 is a time chart for illustrating a current detection time setting function in accordance with the steering state according to a third embodiment of the present invention.

In the third embodiment, as illustrated in FIG. 9, the PWM period is set to the prescribed time in the steering steered state, whereas the PWM period is extended to be three times longer than the prescribed time in the steering non-steered state. Here, when two cycles of the PWM period in the steering steered state is defined as first predetermined time, the number of times of detection of the DC bus current value IDC in the steering steered state is set to one over the first predetermined time. Meanwhile, the number of times of detection in the steering non-steered state is set to ⅓ time over the first predetermined time. As a result, the number of times of execution of the pulse shift control is one over the first predetermined time in the steering steered state, whereas the number of times of execution is ⅓ time over the first predetermined time in the steering non-steered state. Namely, in the steering non-steered state, the number of times of execution of the pulse shift control is reduced to half as compared to the case of the steering steered state. Thus, similarly to the first embodiment, the power consumption along with the pulse shift control can be reduced.

The current detection time setting circuit 31b performs setting so that the number of times of detection of the DC bus current value IDC in the steering non-steered state becomes smaller than one over the first predetermined time through extension of the time of the PWM period. Namely, by extending the time of the PWM period, the number of times of detection within the predetermined time can be changed without changing the number of times of detection within the prescribed PWM period.

In the third embodiment, effects listed below are achieved in addition to the effects (2), (3), and (5) to (13) of the first embodiment.

(16) There is provided a power steering device, including: the steering mechanism 1 configured to steer the front wheels 3, 3 in accordance with a steering operation of the steering wheel 2; the three-phase brushless motor 11 configured to apply a steering force to the steering mechanism 1; the control device (the EPS assist controller 16, the motor controller 30, and the motor driving circuit 42) configured to control drive of the three-phase brushless motor 11; the current command computing unit 37 provided in the EPS assist controller 16, and configured to compute the current command values Id* and Iq* to the three-phase brushless motor 11 based on an operating state of a vehicle; the PWM control unit 34 provided in the motor controller 30, and configured to output the switching signals respectively to a u-phase, a v-phase, and a w-phase of the three-phase brushless motor 11 in accordance with the current command values Id* and Iq*; the three-phase bridge circuit 22 provided in the motor driving circuit 42, the three-phase bridge circuit 22 being constructed of six FETs 21a, 21b, 21c, 21d, 21e, and 21f whose drive is to be controlled by the switching signals and being configured to control the drive of the three-phase brushless motor 11; the shunt resistor 27 provided to the DC bus 26 connected to the three-phase bridge circuit 22, and configured to detect the DC bus current value IDC flowing through the DC bus 26; the current detecting circuit 31a provided in the motor controller 30, and configured to detect, through the shunt resistor 27, the DC bus current value IDC when, among the switching signals to the u-phase, the v-phase, and the w-phase of the three-phase brushless motor 11, the switching signal of a maximum phase with longest energization time is ON and the switching of a minimum phase with shortest energization time and the switching of an intermediate phase are OFF, and the DC bus current value IDC when, among the switching signals to the u-phase, the v-phase, and the w-phase of the three-phase brushless motor 11, the switching signal of the maximum phase is ON and the switching signal of the intermediate phase is ON; the current detecting unit 31 configured to estimate current values of the u-phase, the v-phase, and the w-phase based on the DC bus current value IDC detected by the shunt resistor 27; the current control unit 32 provided in the motor controller 30, and configured to perform feedback correction on the current command values Id* and Iq* based on the current values of the u-phase, the v-phase, and the w-phase, which are estimated by the current detecting unit 31; the pulse shift control circuit 33a provided in the motor controller 30, and configured to correct a phase of an ON timing of the switching signal of the maximum phase or the intermediate phase so that a difference between an ON timing of the switching signal of the maximum phase and an ON timing of the switching signal of the intermediate phase becomes equal to or larger than a second predetermined value larger than a first predetermined value when the difference between the ON timing of the switching signal of the maximum phase and the ON timing of the switching signal of the intermediate phase becomes smaller than the first predetermined value, and to correct a phase of the switching signal of the intermediate phase or the minimum phase so that a difference between the ON timing of the switching signal of the intermediate phase and an ON timing of the switching signal of the minimum phase becomes equal to or larger than the second predetermined value when the difference between the ON timing of the switching signal of the intermediate phase and the ON timing of the switching signal of the minimum phase becomes smaller than the first predetermined value; the steering-signal receiving unit 38 provided in the motor controller 30, and configured to receive the steering torque value T of the steering wheel 2; and the current detection number setting circuit 31b provided in the motor controller 30, and configured to set the number of times of detection of the DC bus current value IDC by the current detecting circuit 31a to one over a first predetermined time when the steering-signal receiving unit 38 receives the steering torque value T indicative of a steering steered state, and to set the number of times of detection so that the number of times of detection becomes smaller than one over the first predetermined time (half of the first predetermined time) when the steering-signal receiving unit 38 receives the steering torque value T indicative of a steering non-steered state.

Thus, the power consumption along with the pulse shift control can be reduced in the steering non-steered state while the motor control with high accuracy in the steering steered state is maintained.

(17) There is provided a control device for a power steering device (the EPS assist controller 16, the motor controller 30, and the motor driving circuit 42), configured to control drive of the three-phase brushless motor 11 configured to apply a steering force to the steering mechanism 1, the control device including: the current command computing unit 37 configured to compute current command values Id* and Iq* to the three-phase brushless motor 11 based on an operating state of a vehicle; the PWM control unit 34 configured to output switching signals respectively to a u-phase, a v-phase, and a w-phase of the three-phase brushless motor 11 in accordance with the current command values Id* and Iq*; the three-phase bridge circuit 22 constructed of six FETs 21a, 21b, 21c, 21d, 21e, and 21f whose drive is to be controlled by the switching signals, and configured to control the drive of the three-phase brushless motor 11; the shunt resistor 27 provided to the DC bus 26 connected to the three-phase bridge circuit 22, and configured to detect the DC bus current value IDC flowing through the DC bus 26; the current detecting circuit 31a configured to detect, through the shunt resistor 27, the DC bus current value IDC when, among the switching signals to the u-phase, the v-phase, and the w-phase of the three-phase brushless motor 11, the switching signal of a maximum phase with longest energization time is ON and the switching of a minimum phase with shortest energization time and the switching of an intermediate phase are OFF, and the DC bus current value IDC when, among the switching signals to the u-phase, the v-phase, and the w-phase of the three-phase brushless motor 11, the switching signal of the maximum phase is ON and the switching signal of the intermediate phase is ON; the current detecting unit 31 configured to estimate current values of the u-phase, the v-phase, and the w-phase based on the DC bus current value IDC detected by the shunt resistor 27; the current control unit 32 configured to perform feedback correction on the current command values Id* and Iq* based on the current values of the u-phase, the v-phase, and the w-phase, which are estimated by the current detecting unit 31; the pulse shift control circuit 33a configured to correct a phase of an ON timing of the switching signal of the maximum phase or the intermediate phase so that a difference between an ON timing of the switching signal of the maximum phase and an ON timing of the switching signal of the intermediate phase becomes equal to or larger than a second predetermined value larger than a first predetermined value when the difference between the ON timing of the switching signal of the maximum phase and the ON timing of the switching signal of the intermediate phase becomes smaller than the first predetermined value, and to correct a phase of the switching signal of the intermediate phase or the minimum phase so that a difference between the ON timing of the switching signal of the intermediate phase and an ON timing of the switching signal of the minimum phase becomes equal to or larger than the second predetermined value when the difference between the ON timing of the switching signal of the intermediate phase and the ON timing of the switching signal of the minimum phase becomes smaller than the first predetermined value; the steering-signal receiving unit 38 configured to receive the steering torque value T of the steering wheel 2; and the current detection number setting circuit 31*b* provided in the motor controller 30, and configured to set the number of times of detection of the DC bus current value IDC by the current detecting circuit 31*a* to one over a first predetermined time when the steering-signal receiving unit 38 receives the steering torque value T indicative of a steering steered state, and to set the number of times of detection so that the number of times of detection becomes smaller than one over the first predetermined time when the steering-signal receiving unit 38 receives the steering torque value T indicative of a steering non-steered state.

Thus, the power consumption along with the pulse shift control can be reduced in the steering non-steered state while the motor control with high accuracy in the steering steered state is maintained.

(18) The current detection number setting circuit 31*b* is configured to extend time of the PWM period so that the number of times of detection becomes smaller than one over the first predetermined time.

Thus, the number of times of detection within the predetermined time can be changed without changing the number of times of detection within the prescribed PWM period.

Fourth Embodiment

A fourth embodiment of the present invention differs from the first embodiment in that the number of times of detection of the DC bus current value IDC is set to zero in the steering non-steered state.

When the steering steered state is determined, the current detection number setting circuit 31*b* sets the number of times of detection of the DC bus current value IDC to one (first predetermined number) over two cycles (first predetermined cycle) of the PWM period. Meanwhile, when the steering non-steered state is determined, the number of times of detection of the DC bus current value IDC is set to zero.

The PWM control unit 34 fixes the PWM duty values of the switching signals to 50% (predetermined duty value) when the steering non-steered state is determined.

Figure 10:
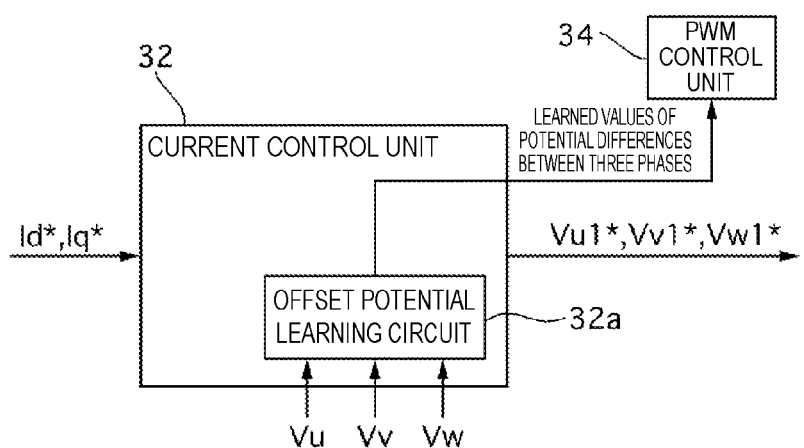
FIG. 10 is a configuration diagram of a current control unit 32 according to a fourth embodiment of the present invention.

In the steering non-steered state, the current control unit 32 determines whether or not an abnormality has occurred in current output due to an electrical failure, based on the voltage values (Vu, Vv, Vw) of the three phases, which are detected by the phase-voltage sensor 28. FIG. 10 is a configuration diagram of the current control unit 32 according to the fourth embodiment. The current control unit 32 includes an offset potential learning circuit 32*a*. The offset potential learning circuit 32*a* learns potential differences (|Vu−Vv|, |Vv−Vw|, |Vw−Vu|) between the voltage values (Vu, Vv, Vw) of the three phases, which are detected by the phase-voltage sensor 28 when the current command values Id* and Iq* are zero.

The PWM control unit 34 corrects the switching signals respectively to the u-, v-, and w-phases so that a potential difference is not generated between the u-, v-, and w-phases, based on the potential differences learned by the offset potential learning circuit 32*a*.

The remaining configuration is the same as that of the first embodiment, and therefore the illustration and description thereof are herein omitted.

[Current Output Abnormality Detection Processing]

Figure 11:
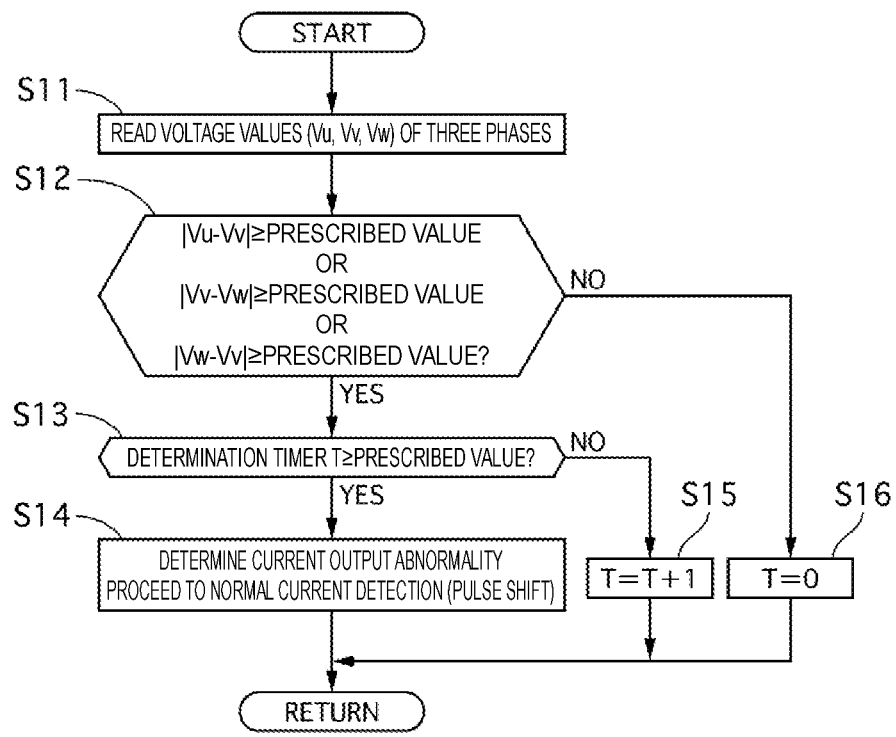
FIG. 11 is a flowchart for illustrating a flow of current output abnormality detection processing executed by the current control unit 32 according to the fourth embodiment.

FIG. 11 is a flowchart for illustrating a flow of current output abnormality detection processing executed by the current control unit 32 according to the fourth embodiment. Each of steps is described below.

In Step S11, the voltage values (Vu, Vv, Vw) of the three phases, which are detected by the phase-voltage sensor 28, are read.

In Step S12, it is determined whether or not the potential differences (|Vu−Vv|, |Vv−Vw|, |Vw−Vu|) between the voltage values (Vu, Vv, Vw) of the u-, v-, and w-phases include a potential difference equal to or larger than a prescribed value. When a result is YES, the processing proceeds to Step S13. When the result is NO, the processing proceeds to Step S16. The prescribed value is set to a potential difference (value in the vicinity of 0) based on which the current output abnormality can be determined.

In Step S13, it is determined whether or not the determination timer T is equal to or larger than the prescribed value. When a result is YES, the processing proceeds to Step S14. When the result is NO, the processing proceeds to Step S15.

In Step S14, the current output abnormality is determined, and the processing proceeds to the current detection during the normal operation (steering steered state).

In Step S15, the determination timer T is incremented.
In Step S16, the determination timer T is reset.
Next, functions are described.

[Function of Reducing Current Detection Number when Steering Wheel is not Steered]

In the fourth embodiment, the current detection number setting circuit 31*b* sets the number of times of detection of the DC bus current value IDC by the current detecting circuit 31*a* to one over two cycles of the PWM period in the steering steered state, and to zero in the steering non-steered state. As a result, the number of times of execution of the pulse shift control becomes one over the two cycles of the PWM period in the steering steered state, and zero in the steering non-steered state. Namely, in the steering non-steered state in which the highly accurate motor control is not required, the DC bus current value IDC is not detected. Therefore, the power consumption along with the pulse shift control can be significantly reduced.

[Reduction of Computation Load by Fixing PWM Duty Values]

When the steering non-steered state is determined, the PWM duty values of the switching signals are fixed to 50%. In the steering non-steered state, the DC bus current value IDC is not detected. Further, the current command values Id* and Iq* are not computed. Therefore, through fixing of the PWM duty values to 50%, a computation load can be reduced.

[Current Output Abnormality Determination Function]

The motor driving circuit 42 includes the phase-voltage sensor 28 configured to detect the voltage values (Vu, Vv, Vw) of the u-, v-, and w-phases. Thus, even when the detection of the DC bus current value IDC is not performed when the steering wheel is not steered, a simple abnormality determination can be performed based on the voltage values (Vu, Vv, Vw) detected by the phase-voltage sensor 28.

Then, when the potential differences between the voltage values of the u-, v-, and w-phases, which are detected by the phase-voltage sensor 28, include the potential difference equal to or larger than the prescribed value, the current control unit 32 determines a current output abnormality. Specifically, the current command values Id* and Iq* are zero when the steering wheel is not steered. Therefore, it is highly likely that no potential difference is generated between the phases in a case where the current output is normal. Meanwhile, when the potential difference is generated between the phases, specifically, when the current flows although the current command values Id* and Iq* are zero, the current output abnormality is determined.

[Improvement of Abnormality Detection Accuracy by Cancelling Resistance Value Error]

The PWM control unit 34 corrects the switching signals to the u-, v-, and w-phases so that the potential difference is not generated between the u-, v-, and w-phases, based on learned values of the potential differences between the u-, v-, and w-phases, which are learned by the offset potential learning circuit 32a. There is a risk in that the phase-voltage sensor 28 and the three-phase bridge circuit 22 may contain a product error which may lead to a resistance value error between the u-, v-, and w-phases. As a result, the potential differences are generated between the u-, v-, and w-phases. However, the potential differences are generated not due to an abnormality in the device but due to the resistance value error. Thus, through cancellation of the resistance value error through learning, abnormality detection accuracy can be enhanced.

In the fourth embodiment, effects listed below are achieved in addition to the effects (1) to (13) of the first embodiment.

(19) There is provided a power steering device, including: the steering mechanism 1 configured to steer the front wheels 3, 3 in accordance with a steering operation of the steering wheel 2; the three-phase brushless motor 11 configured to apply a steering force to the steering mechanism 1; the control device (the EPS assist controller 16, the motor controller 30, and the motor driving circuit 42) configured to control drive of the three-phase brushless motor 11; the current command computing unit 37 provided in the EPS assist controller 16, and configured to compute the current command values Id* and Iq* to the three-phase brushless motor 11 based on an operating state of a vehicle; the PWM control unit 34 provided in the motor controller 30, and configured to output the switching signals respectively to a u-phase, a v-phase, and a w-phase of the three-phase brushless motor 11 in accordance with the current command values Id* and Iq*; the three-phase bridge circuit 22 provided in the motor driving circuit 42, the three-phase bridge circuit 22 being constructed of six FETs 21a, 21b, 21c, 21d, 21e, and 21f whose drive is to be controlled by the switching signals and being configured to control the drive of the three-phase brushless motor 11; the shunt resistor 27 provided to the DC bus 26 connected to the three-phase bridge circuit 22, and configured to detect the DC bus current value IDC flowing through the DC bus 26; the current detecting circuit 31a provided in the motor controller 30, and configured to detect, through the shunt resistor 27, the DC bus current value IDC when, among the switching signals to the u-phase, the v-phase, and the w-phase of the three-phase brushless motor 11, the switching signal of a maximum phase with longest energization time is ON and the switching of a minimum phase with shortest energization time and the switching of an intermediate phase are OFF, and the DC bus current value IDC when, among the switching signals to the u-phase, the v-phase, and the w-phase of the three-phase brushless motor 11, the switching signal of the maximum phase is ON and the switching signal of the intermediate phase is ON; the current detecting unit 31 configured to estimate current values of the u-phase, the v-phase, and the w-phase based on the DC bus current value IDC detected by the shunt resistor 27; the current control unit 32 provided in the motor controller 30, and configured to perform feedback correction on the current command values Id* and Iq* based on the current values of the u-phase, the v-phase, and the w-phase, which are estimated by the current detecting unit 31; the pulse shift control circuit 33a provided in the motor controller 30, and configured to correct a phase of an ON timing of the switching signal of the maximum phase or the intermediate phase so that a difference between an ON timing of the switching signal of the maximum phase and an ON timing of the switching signal of the intermediate phase becomes equal to or larger than a second predetermined value larger than a first predetermined value when the difference between the ON timing of the switching signal of the maximum phase and the ON timing of the switching signal of the intermediate phase becomes smaller than the first predetermined value, and to correct a phase of the switching signal of the intermediate phase or the minimum phase so that a difference between the ON timing of the switching signal of the intermediate phase and an ON timing of the switching signal of the minimum phase becomes equal to or larger than the second predetermined value when the difference between the ON timing of the switching signal of the intermediate phase and the ON timing of the switching signal of the minimum phase becomes smaller than the first predetermined value; the steering-signal receiving unit 38 provided in the motor controller 30, and configured to receive the steering torque value T of the steering wheel 2; and the current detection number setting circuit 31b provided in the motor controller 30, and configured to set the number of times of detection of the DC bus current value IDC by the current detecting circuit 31a to one over a first predetermined time when the steering-signal receiving unit 38 receives the steering torque value T indicative of a steering steered state, and to set the number of times of detection to zero when the steering-signal receiving unit 38 receives the steering torque value T indicative of a steering non-steered state.

Thus, the power consumption along with the pulse shift control can be reduced significantly in the steering non-steered state while the motor control with high accuracy in the steering steered state is maintained.

(20) When the steering non-steered state is determined, the PWM control unit 34 fixes the PWM duty values of the switching signals to 50%.

Thus, the computation load can be reduced.

(21) The motor driving circuit 42 includes the phase-voltage sensor 28 configured to detect the voltage values (Vu, Vv, Vw) of the u-, v-, and w-phases.

Thus, even when the DC bus current value IDC is not detected, a simple abnormality determination can be performed based on the voltage values (Vu, Vv, Vw) detected by the phase-voltage sensor 28.

(22) When the potential differences between the voltage values of the u-, v-, and w-phases, which are detected by the phase-voltage sensor 28, include the potential difference equal to or larger than the prescribed value, the current control unit 32 determines the current output abnormality.

Thus, even when the DC bus current value IDC is not detected, the current output abnormality can be determined based on the voltage values (Vu, Vv, Vw) detected by the phase-voltage sensor 28.

(23) The current control unit 32 includes the offset potential learning circuit 32a configured to learn the potential differences (|Vu−Vv|, |Vv−Vw|, |Vw−Vu|) between the voltage values (Vu, Vv, Vw) of the three phases, which are detected by the phase-voltage sensor 28, when the current command values Id* and Iq* are zero. The PWM control unit 34 corrects the switching signals to the u-, v-, and w-phases so as not to generate the potential difference between the u-, v-, and w-phases, based on the potential differences learned by the offset potential learning circuit 32a.

Thus, the resistance value error can be cancelled, thereby enabling enhancement of the abnormality detection accuracy.

Fifth Embodiment

A fifth embodiment of the present invention differs from the fourth embodiment in the method of determining the current output abnormality. The fifth embodiment is the same as the fourth embodiment in that the number of times of detection of the DC bus current value IDC through the pulse shift control is set to zero in the steering non-steered state and that the PWM duty value of the switching signals is fixed to 50% in the steering non-steered state.

Figure 12:
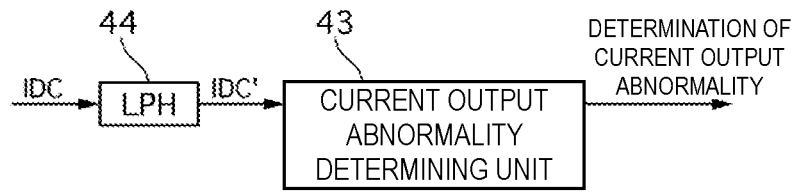
FIG. 12 is a configuration diagram of a current output abnormality determination unit 43 according to a fifth embodiment of the present invention.

FIG. 12 is a configuration diagram of a current output abnormality determining unit 43 according to the fifth embodiment. When the PWM duty values of the switching signals are fixed to 50% in the steering non-steered state, the current output abnormality determining unit 43 determines whether or not an abnormality has occurred in the current output due to an electrical failure, based on a DC bus current value IDC' that has passed through a low-pass filter (filter circuit) 44. The current output abnormality determining unit 43 and the low-pass filter 44 are provided inside the motor controller 30. The remaining configuration in the motor controller 30 is the same as that of the first embodiment illustrated in FIG. 2 although an illustration thereof is omitted.

[Current Output Abnormality Detection Processing]

Figure 13:
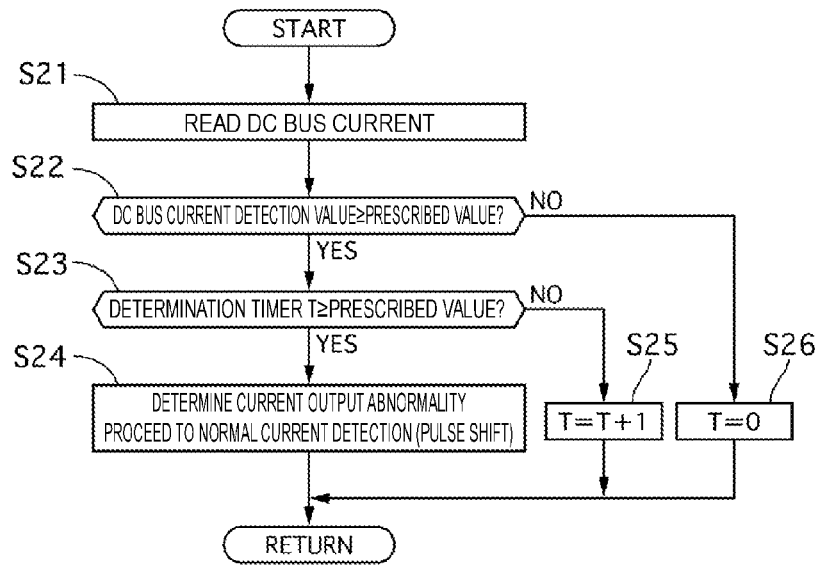
FIG. 13 is a flowchart for illustrating a flow of current output abnormality detection processing executed by the current output abnormality determination unit 43 according to the fifth embodiment.

FIG. 13 is a flowchart for illustrating a flow of current output abnormality detection processing executed by the current output abnormality determining unit 43 according to the fifth embodiment. Each of steps is described below.

In Step S21, the DC bus current value IDC' in the steering non-steered state is read.

In Step S22, it is determined whether or not the DC bus current value IDC' is equal to or larger than a prescribed value. When a result of determination is YES, the processing proceeds to Step S23. When the result of determination is NO, the processing proceeds to Step S26. The prescribed value is set to a current value (value in the vicinity of zero) based on which the current output abnormality is determined.

In Step S23, it is determined whether or not the determination timer T is equal to or larger than the prescribed value. When a result is YES, the processing proceeds to Step S24. When the result is NO, the processing proceeds to Step S25.

In Step S24, the current output abnormality is determined, and the processing proceeds to the current detection during the normal operation (steering steered state).

In Step S25, the determination timer T is incremented.

In Step S26, the determination timer T is reset.

Next, functions are described.

[Current Output Abnormality Determination Function]

Figure 14:
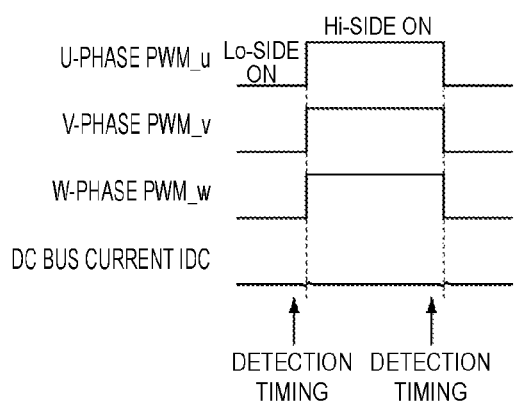
FIG. 14 are charts for illustrating a difference between PWM switch timings and a DC bus current value in a steering-wheel non-steered state during a normal operation and those in a case of a current output abnormality.
Figure 14:
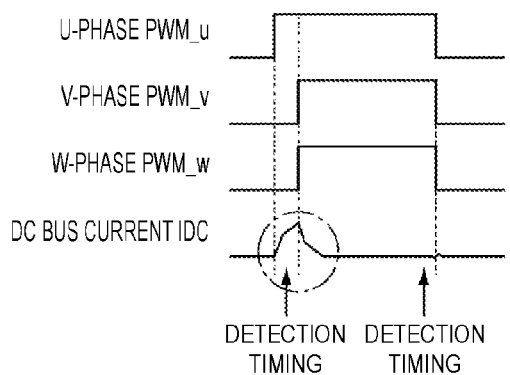

The current output abnormality determining unit 43 detects an abnormality in the PWM duty values fixed to 50%, based on the DC bus current value IDC. FIG. 14 are charts for illustrating PWM switch timings and the DC bus current value in the steering non-steered state. FIG. 14(a) is a chart for illustrating a normal operation. In a case where the PWM duty values are fixed in the steering non-steered state when the current output abnormality does not occur, the DC bus current value IDC immediately before switching between an ON timing and an OFF timing of the switching signal is 0 [A]. Meanwhile, as illustrated in FIG. 14(b), when an abnormality has occurred in the u-phase PWM output, a shift occurs in at least one of the ON timings or the OFF timings of the switching signals of the u-, v-, and w-phases, thereby preventing the DC bus current value IDC from being 0 [A]. Specifically, when the steering wheel is not steered, the DC bus current value IDC is 0. Meanwhile, when the DC bus current value IDC is not 0, the occurrence of the current output abnormality is determined. It is immediately before or immediately after the switching between the ON timing and the OFF timing of the switching signal that the DC bus current value satisfies IDC≠0 in a case of current output abnormality. Thus, through setting of a timing of detection of the DC bus current value IDC immediately before or immediately after the switching between the ON timing and the OFF timing of the switching signal, the current output abnormality can be detected with the highest accuracy.

The current output abnormality determining unit 43 determines the current output abnormality based on the DC bus current value IDC' that has passed through the low-pass filter 44. Specifically, the DC bus current value IDC' that has passed through the low-pass filter is smoothed in fluctuation of noise or a value in a short period. Thus, when the value after the passage through the low-pass filter is approximately zero, it is determined that the PWM duty values fixed to 50% are reliable.

In the fifth embodiment, effects listed below are achieved in addition to the effects (1) to (13) of the first embodiment and the effects (19) and (20) of the fourth embodiment.

(24) The current output abnormality determining unit 43 detects an abnormality in the PWM duty values fixed to 50%, based on the DC bus current value IDC.

Thus, the current output abnormality can be detected when the steering wheel is not steered.

(25) The motor controller 30 includes the low-pass filter 44. The current output abnormality determining unit 43 detects the abnormality in the PWM duty values fixed to 50%, based on the DC bus current value IDC' that has passed through the low-pass filter circuit.

Thus, the current output abnormality when the steering wheel is not steered can be detected with high accuracy.

Sixth Embodiment

A sixth embodiment of the present invention differs from the fourth embodiment in the method of determining the current output abnormality. The sixth embodiment is the same as the fourth embodiment in that the number of times of detection of the DC bus current value IDC is set to zero in the steering non-steered state and that the PWM duty value of the switching signals is fixed to 50% in the steering non-steered state.

In the sixth embodiment, whether or not the abnormality has occurred in the current output due to the electrical failure is determined in the motor controller 30, based on the switching signal immediately before or immediately after the switching between the ON timings and the OFF timings of the switching signals respectively to the u-phase, the v-phase, and the w-phase of the motor 11. Specifically, in a case where one of the ON timings and the OFF timings of the switching signals does not coincide with each other between the phases when the PWM duty values are fixed to 50% in the steering non-steered state, the current output abnormality is determined.

Next, functions are described.

[Current Output Abnormality Determination Function]

As illustrated in FIG. 14(b), in a case where the PWM duty values are fixed in the steering non-steered state, when the abnormality has occurred in any of the outputs of the u-, the v-, and the w-phases, a shift occurs between at least one of the ON timings and the OFF timings of the switching signals of the u-, the v-, and the w-phases. Thus, through observation of whether or not the switching timings of the respective phases coincide with each other, the current output abnormality can be detected with the highest accuracy.

In the sixth embodiment, effects listed below are achieved in addition to the effects (1) to (13) of the first embodiment and the effects (19) and (20) of the fourth embodiment.

(26) The motor controller 30 detects the current output abnormality based on the switching signals immediately before or immediately after the switching between the ON timing and the OFF timing of each of the switching signals.

Thus, the current output abnormality when the steering wheel is not steered can be detected with the highest accuracy.

Other Embodiments

The embodiments of the present invention have been described above based on each of the embodiments. However, the specific configuration of the present invention is not limited to the configuration described in each of the embodiments. A change in design without departing from the scope of the gist of the invention is encompassed in the present invention.

For example, the time of the PWM period at the low vehicle speed may be extended to be two times larger than that at the intermediate and high vehicle speed so that the number of times of detection of the DC bus current value IDC per first predetermined time is reduced in the third embodiment. Similarly, the time of the PWM period during the idle stop may be extended to be three times larger than that in a non-idle stop state so that the number of times of detection of the DC bus current value IDC per first predetermined time is reduced.

Examples of technical ideas understood from the embodiments are described below.

(1) A power steering device, including: a steering mechanism configured to steer steered wheels in accordance with a steering operation of a steering wheel; a three-phase brushless motor configured to apply a steering force to the steering mechanism; a control device configured to control drive of the three-phase brushless motor; a command current computing unit provided in the control device, and configured to compute a command current value to the three-phase brushless motor based on an operating state of a vehicle; a PWM control unit provided in the control device, and configured to output PWM duty signals respectively to a u-phase, a v-phase, and a w-phase of the three-phase brushless motor in accordance with the command current value; a bridge circuit provided in the control device, the bridge circuit being constructed of a switching circuit whose drive is to be controlled by the PWM duty signals and being configured to control the drive of the three-phase brushless motor; a current sensor provided to a DC bus connected to the bridge circuit, and configured to detect a DC bus current value flowing through the DC bus; a current detecting circuit provided in the control device, and configured to detect, through the current sensor, the DC bus current value when, among the PWM duty signals to the u-phase, the v-phase, and the w-phase of the three-phase brushless motor, the PWM duty signal of a maximum phase with longest energization time is ON and the PWM duty signal of a minimum phase with shortest energization time and the PWM duty signal of an intermediate phase are OFF, and the DC bus current value when, among the PWM duty signals to the u-phase, the v-phase, and the w-phase of the three-phase brushless motor, the PWM duty signal of the maximum phase is ON and the PWM duty signal of the intermediate phase is ON; a phase-current computing unit configured to estimate current values of the u-phase, the v-phase, and the w-phase based on the DC bus current value detected by the current sensor; a current feedback circuit provided in the control device, and configured to perform feedback correction on the command current value based on the current values of the u-phase, the v-phase, and the w-phase, which are estimated by the phase-current computing unit; a pulse shift control circuit provided in the control device, and configured to correct a phase of an ON timing of the PWM duty signal of the maximum phase or the intermediate phase so that a difference between an ON timing of the PWM duty signal of the maximum phase and an ON timing of the PWM duty signal of the intermediate phase becomes equal to or larger than a second predetermined value larger than a first predetermined value when the difference between the ON timing of the PWM duty signal of the maximum phase and the ON timing of the PWM duty signal of the intermediate phase becomes smaller than the first predetermined value, and to correct a phase of the PWM duty signal of the intermediate phase or the minimum phase so that a difference between the ON timing of the PWM duty signal of the intermediate phase and an ON timing of the PWM duty signal of the minimum phase becomes equal to or larger than the second predetermined value when the difference between the ON timing of the PWM duty signal of the intermediate phase and the ON timing of the PWM duty signal of the minimum phase becomes smaller than the first predetermined value; a steering-signal receiving unit provided in the control circuit, and configured to receive a steering-state signal of the steering wheel; and a current detection number setting circuit provided in the control device, and configured to set the number of times of detection of the DC bus current value by the current detecting circuit to a first predetermined number over a first predetermined cycle of a PWM period when the steering-signal receiving unit receives the steering-state signal indicative of a steering operation state, and to set the number of times of detection so that the number of times of detection becomes smaller than the first predetermined number over the first predetermined cycle of the PWM period when the steering-signal receiving unit receives the steering-state signal indicative of a non-steered state.

(2) In the power steering device according to Item (1), the pulse shift control circuit is configured to perform the pulse shift control when the detection of the DC bus current value is executed by the current detecting circuit.

(3) In the power steering device according to Item (1), the control device includes a vehicle-speed receiving unit configured to receive a vehicle-speed signal, and the current detection number setting circuit is configured to change the number of times of detection in accordance with the vehicle-speed signal.

(4) A power steering device, including: a steering mechanism configured to steer steered wheels in accordance with a steering operation of a steering wheel; a three-phase brushless motor configured to apply a steering force to the steering mechanism; a control device configured to control drive of the three-phase brushless motor; a command current computing unit provided in the control device, and configured to compute a command current value to the three-phase brushless motor based on an operating state of a vehicle; a PWM control unit provided in the control device, and configured to output PWM duty signals respectively to a u-phase, a v-phase, and a w-phase of the three-phase brushless motor in accordance with the command current value; a bridge circuit provided in the control device, the bridge circuit being constructed of a switching circuit whose drive is to be controlled by the PWM duty signals and being configured to control the drive of the three-phase brushless motor; a current sensor provided to a DC bus connected to the bridge circuit, and configured to detect a DC bus current value flowing through the DC bus; a current detecting circuit provided in the control device, and configured to detect, through the current sensor, the DC bus current value when, among the PWM duty signals to the u-phase, the v-phase, and the w-phase of the three-phase brushless motor, the PWM duty signal of a maximum phase with longest energization time is ON and the PWM duty signal of a minimum phase with shortest energization time and the PWM duty signal of an intermediate phase are OFF, and the DC bus current value when, among the PWM duty signals to the u-phase, the v-phase, and the w-phase of the three-phase brushless motor, the PWM duty signal of the maximum phase is ON and the PWM duty signal of the intermediate phase is ON; a phase-current computing unit configured to estimate current values of the u-phase, the v-phase, and the w-phase based on the DC bus current value detected by the current sensor; a current feedback circuit provided in the control device, and configured to perform feedback correction on the command current value based on the current values of the u-phase, the v-phase, and the w-phase, which are estimated by the phase-current computing unit; a pulse shift control circuit provided in the control device, and configured to correct a phase of an ON timing of the PWM duty signal of the maximum phase or the intermediate phase so that a difference between an ON timing of the PWM duty signal of the maximum phase and an ON timing of the PWM duty signal of the intermediate phase becomes equal to or larger than a second predetermined value larger than a first predetermined value when the difference between the ON timing of the PWM duty signal of the maximum phase and the ON timing of the PWM duty signal of the intermediate phase becomes smaller than the first predetermined value, and to correct a phase of the PWM duty signal of the intermediate phase or the minimum phase so that a difference between the ON timing of the PWM duty signal of the intermediate phase and an ON timing of the PWM duty signal of the minimum phase becomes equal to or larger than the second predetermined value when the difference between the ON timing of the PWM duty signal of the intermediate phase and the ON timing of the PWM duty signal of the minimum phase becomes smaller than the first predetermined value; a steering-signal receiving unit provided in the control circuit, and configured to receive a steering-state signal of the steering wheel; and a current detection number setting circuit provided in the control device, and configured to set the number of times of detection of the DC bus current value by the current detecting circuit to a first predetermined number over a first predetermined time when the steering-signal receiving unit receives the steering-state signal indicative of a steering operation state, and to set the number of times of detection so that the number of times of detection becomes smaller than the first predetermined number over the first predetermined time when the steering-signal receiving unit receives the steering-state signal indicative of a non-steered state.

(5) A power steering device, including: a steering mechanism configured to steer steered wheels in accordance with a steering operation of a steering wheel; a three-phase brushless motor configured to apply a steering force to the steering mechanism; a control device configured to control drive of the three-phase brushless motor; a command current computing unit provided in the control device, and configured to compute a command current value to the three-phase brushless motor based on an operating state of a vehicle; a PWM control unit provided in the control device, and configured to output PWM duty signals respectively to a u-phase, a v-phase, and a w-phase of the three-phase brushless motor in accordance with the command current value; a bridge circuit provided in the control device, the bridge circuit being constructed of a switching circuit whose drive is to be controlled by the PWM duty signals and being configured to control the drive of the three-phase brushless motor; a current sensor provided to a DC bus connected to the bridge circuit, and configured to detect a DC bus current value flowing through the DC bus; a current detecting circuit provided in the control device, and configured to detect, through the current sensor, the DC bus current value when, among the PWM duty signals to the u-phase, the v-phase, and the w-phase of the three-phase brushless motor, the PWM duty signal of a maximum phase with longest energization time is ON and the PWM duty signal of a minimum phase with shortest energization time and the PWM duty signal of an intermediate phase are OFF, and the DC bus current value when, among the PWM duty signals to the u-phase, the v-phase, and the w-phase of the three-phase brushless motor, the PWM duty signal of the maximum phase is ON and the PWM duty signal of the intermediate phase is ON; a phase-current computing unit configured to estimate current values of the u-phase, the v-phase, and the w-phase based on the DC bus current value detected by the current sensor; a current feedback circuit provided in the control device, and configured to perform feedback correction on the command current value based on the current values of the u-phase, the v-phase, and the w-phase, which are estimated by the phase-current computing unit; a pulse shift control circuit provided in the control device, and configured to correct a phase of an ON timing of the PWM duty signal of the maximum phase or the intermediate phase so that a difference between an ON timing of the PWM duty signal of the maximum phase and an ON timing of the PWM duty signal of the intermediate phase becomes equal to or larger than a second predetermined value larger than a first predetermined value when the difference between the ON timing of the PWM duty signal of the maximum phase and the ON timing of the PWM duty signal of the intermediate phase becomes smaller than the first predetermined value, and to correct a phase of the PWM duty signal of the intermediate phase or the minimum phase so that a difference between the ON timing of the PWM duty signal of the intermediate phase and an ON timing of the PWM duty signal of the minimum phase becomes equal to or larger than the second predetermined value when the difference between the ON timing of the PWM duty signal of the intermediate phase and the ON timing of the PWM duty signal of the minimum phase becomes smaller than the first predetermined value; a steering-signal receiving unit provided in the control circuit, and configured to receive a steering-state signal of the steering wheel; and a current detection number setting circuit provided in the control device, and configured to set the number of times of detection of the DC bus current value by the current detecting circuit to a first predetermined number over a first predetermined time when the steering-signal receiving unit receives the steering-state signal indicative of a steering operation state, and to set the number of times of detection to zero when the steering-signal receiving unit receives the steering-state signal indicative of a non-steered state.

(6) In the power steering device according to Item (5), the PWM control unit is configured to, when the steering-signal receiving unit receives the steering-state signal indicative of the non-steered state, fix PWM duty values corresponding to the PWM duty signals to a predetermined duty value.

(7) A control device for a power steering device, configured to control drive of a three-phase brushless motor configured to apply a steering force to a steering mechanism, the control device including: a command current computing unit configured to compute a command current value to the three-phase brushless motor based on an operating state of a vehicle; a PWM control unit configured to output PWM duty signals respectively to a u-phase, a v-phase, and a w-phase of the three-phase brushless motor in accordance with the command current value; a bridge circuit constructed of a switching circuit whose drive is to be controlled by the PWM duty signals, and configured to control the drive of the three-phase brushless motor; a current sensor provided to a DC bus connected to the bridge circuit, and configured to detect a DC bus current value flowing through the DC bus; a current detecting circuit configured to detect, through the current sensor, the DC bus current value when, among the PWM duty signals to the u-phase, the v-phase, and the w-phase of the three-phase brushless motor, the PWM duty signal of a maximum phase with longest energization time is ON and the PWM duty signal of a minimum phase with shortest energization time and the PWM duty signal of an intermediate phase are OFF, and the DC bus current value when, among the PWM duty signals to the u-phase, the v-phase, and the w-phase of the three-phase brushless motor, the PWM duty signal of the maximum phase is ON and the PWM duty signal of the intermediate phase is ON; a phase-current computing unit configured to estimate current values of the u-phase, the v-phase, and the w-phase based on the DC bus current value detected by the current sensor; a current feedback circuit configured to perform feedback correction on the command current value based on the current values of the u-phase, the v-phase, and the w-phase, which are estimated by the phase-current computing unit; a pulse shift control circuit configured to correct a phase of an ON timing of the PWM duty signal of the maximum phase or the intermediate phase so that a difference between an ON timing of the PWM duty signal of the maximum phase and an ON timing of the PWM duty signal of the intermediate phase becomes equal to or larger than a second predetermined value larger than a first predetermined value when the difference between the ON timing of the PWM duty signal of the maximum phase and the ON timing of the PWM duty signal of the intermediate phase becomes smaller than the first predetermined value, and to correct a phase of the PWM duty signal of the intermediate phase or the minimum phase so that a difference between the ON timing of the PWM duty signal of the intermediate phase and an ON timing of the PWM duty signal of the minimum phase becomes equal to or larger than the second predetermined value when the difference between the ON timing of the PWM duty signal of the intermediate phase and the ON timing of the PWM duty signal of the minimum phase becomes smaller than the first predetermined value; a steering-signal receiving unit configured to receive a steering-state signal of the steering wheel; and a current detection number setting circuit provided in the control device, and configured to set the number of times of detection of the DC bus current value by the current detecting circuit to a first predetermined number over a first predetermined cycle of a PWM period when the steering-signal receiving unit receives the steering-state signal indicative of a steering operation state, and to set the number of times of detection so that the number of times of detection becomes smaller than the first predetermined number over the first predetermined cycle of the PWM period when the steering-signal receiving unit receives the steering-state signal indicative of a non-steered state.

(8) A control device for a power steering device, configured to control drive of a three-phase brushless motor configured to apply a steering force to a steering mechanism, the control device including: a command current computing unit configured to compute a command current value to the three-phase brushless motor based on an operating state of a vehicle; a PWM control unit configured to output PWM duty signals respectively to a u-phase, a v-phase, and a w-phase of the three-phase brushless motor in accordance with the command current value; a bridge circuit constructed of a switching circuit whose drive is to be controlled by the PWM duty signals, configured to control the drive of the three-phase brushless motor; a current sensor provided to a DC bus connected to the bridge circuit, and configured to detect a DC bus current value flowing through the DC bus; a current detecting circuit configured to detect, through the current sensor, the DC bus current value when, among the PWM duty signals to the u-phase, the v-phase, and the w-phase of the three-phase brushless motor, the PWM duty signal of a maximum phase with longest energization time is ON and the PWM duty signal of a minimum phase with shortest energization time and the PWM duty signal of an intermediate phase are OFF, and the DC bus current value when, among the PWM duty signals to the u-phase, the v-phase, and the w-phase of the three-phase brushless motor, the PWM duty signal of the maximum phase is ON and the PWM duty signal of the intermediate phase is ON; a phase-current computing unit configured to estimate current values of the u-phase, the v-phase, and the w-phase based on the DC bus current value detected by the current sensor; a current feedback circuit configured to perform feedback correction on the command current value based on the current values of the u-phase, the v-phase, and the w-phase, which are estimated by the phase-current computing unit; a pulse shift control circuit configured to correct a phase of an ON timing of the PWM duty signal of the maximum phase or the intermediate phase so that a difference between an ON timing of the PWM duty signal of the maximum phase and an ON timing of the PWM duty signal of the intermediate phase becomes equal to or larger than a second predetermined value larger than a first predetermined value when the difference between the ON timing of the PWM duty signal of the maximum phase and the ON timing of the PWM duty signal of the intermediate phase becomes smaller than the first predetermined value, and to correct a phase of the PWM duty signal of the intermediate phase or the minimum phase so that a difference between the ON timing of the PWM duty signal of the intermediate phase and an ON timing of the PWM duty signal of the minimum phase becomes equal to or larger than the second predetermined value when the difference between the ON timing of the PWM duty signal of the intermediate phase and the ON timing of the PWM duty signal of the minimum phase becomes smaller than the first predetermined value; a steering-signal receiving unit configured to receive a steering-state signal of the steering wheel; and a current detection number setting circuit provided in the control device, and configured to set a number of times of detection of the DC bus current value by the current detecting circuit to a first predetermined number over a first predetermined time when the steering-signal receiving unit receives the steering-state signal indicative of a steering operation state, and to set the number of times of detection so that the number of times of detection becomes smaller than the first predetermined number over the first predetermined time when the steering-signal receiving unit receives the steering-state signal indicative of a non-steered state.

(a) In the power steering device according to Item (2), the pulse shift control circuit is configured to avoid performing the pulse shift control when the detection of the DC bus current value is not executed by the current detecting circuit.

When the DC bus current value is not detected, the pulse shift control is not performed, thereby enabling the reduction of the power consumption.

(b) In the power steering device according to Item (2), the current feedback circuit is configured to, when the steering-state signal changes from the non-steered state to the steering operation state, perform the feedback control on the command current value by using a latest value of the DC bus current value detected by the current detecting circuit.

Feedback correction is performed using the DC bus current value that is already detected, without waiting for next detection. Thus, responsiveness at restart of the motor control can be enhanced.

(c) In the power steering device according to Item (3), the current detection number setting circuit is configured to change the number of times of detection so that the number of times of detection becomes smaller as the vehicle-speed signal represents a lower vehicle speed.

The steering feel is more easily obtained at a higher vehicle speed. Thus, the power consumption can be reduced at the low vehicle speed while the steering feel at the high vehicle speed is kept.

(d) In the power steering device according to Item (c), the current detection number setting circuit is configured to set the number of times of detection smaller than the first predetermined number when the vehicle-speed signal represents 0 km/h.

When the vehicle speed is 0 km/h, it is most difficult to obtain the steering feel. Therefore, through reduction of the number of times of detection in this state, the power consumption can be reduced while the steering feeling at the vehicle speed exceeding 0 km/h, namely, during running is kept.

(e) In the power steering device according to Item (3), the current detection number setting circuit is configured to set the number of times of detection smaller than the first predetermined number when the vehicle-speed signal represents a speed lower than a first predetermined vehicle speed and when the vehicle-speed signal represents a speed higher than a second predetermined vehicle speed higher than the first predetermined vehicle speed.

It is difficult to obtain the steering feel at the low vehicle speed, whereas the rate of the application of the steering force becomes small at the high vehicle speed. Thus, through reduction of the number of times of detection of the current in this state, the power consumption can be reduced at the low vehicle speed and the high vehicle speed while the steering feel at the intermediate vehicle speed at which the steering feel is most easily obtained is kept.

(f) In the power steering device according to Item (1), the current detection number setting circuit is configured to set the number of times of detection so that the number of times of detection becomes smaller than the first predetermined number over the first predetermined cycle of the PWM period when the steering-signal receiving unit receives the steering-state signal indicative of the non-steered state continuously for predetermined time, and to set the number of times of detection to the first predetermined number over the first predetermined cycle of the PWM period when the steering-signal receiving unit receives the steering-state signal indicative of the steering operation state.

When the signal indicative of the non-steered state is received continuously for predetermined time, the non-steered state is determined. As a result, an erroneous determination for the non-steered state although the steering operation is being performed can be made less likely to occur. Meanwhile, when the signal indicative of the steering operation state is received, the steering operation state is immediately determined. As a result, a delay in application of an appropriate steering force can be suppressed.

(g) In the power steering device according to Item (f), the current detection number setting circuit includes a steering-state determining circuit configured to determine whether the steering wheel is in the steering operation state or a non-steered state, and is configured to set the number of times of detection to the first predetermined number over the first predetermined cycle of the PWM period when the steering-state determining circuit determines the steering operation state based on the steering-state signal, and to set the number of times of detection so that the number of times of detection becomes smaller than the first predetermined number over the first predetermined cycle of the PWM period when the steering-state determining circuit determines the non-steered state, and the steering-state determining circuit is configured to determine that the steering wheel is in the non-steered state, based on a steering torque value generated in the steering mechanism, the motor rpm, or the current command value.

The detection accuracy for the non-steering state of the driver can be improved based on the steering torque or the command current value computed from the steering torque, or the rpm of the motor co-rotated with the pinion gear 5.

(h) In the power steering device according to Item (f), the current detection number setting circuit includes a steering-state determining circuit configured to determine whether the steering wheel is in the steering operation state or a non-steered state, and is configured to set the number of times of detection to the first predetermined number over the first predetermined cycle of the PWM period when the steering-state determining circuit determines the steering operation state based on the steering-state signal, and to set the number of times of detection so that the number of times of detection becomes smaller than the first predetermined number over the first predetermined cycle of the PWM period when the steering-state determining circuit determines the non-steered state, and the steering-state determining circuit is configured to determine that the steering wheel is in the steering operation state, based on a steering torque value generated in the steering mechanism.

Through determination of the steering operation state based on the steering torque, the steering operation state can be determined early.

(i) In the power steering device according to Item (1), the control device includes an idle-stop signal receiving unit configured to receive an idle stop signal indicating that the vehicle is in an idle stop state, and the current detection number setting circuit is configured to set the number of times of detection so that the number of times of detection becomes smaller than the first predetermined number over the first predetermined cycle of the PWM period when the idle-stop signal receiving unit receives the idle stop signal.

During the idle stop of the vehicle, there is a high possibility that the vehicle is stopped and the steering operation is not performed. Further, during the idle stop, the power is not generated by the alternator. At this time, through reduction of the number of times of detection, the power consumption can be reduced during the idle stop.

(j) In the power steering device according to Item (i), the current detection number setting circuit is configured to, when the idle-stop signal receiving unit receives the idle stop signal and the steering-signal receiving unit receives the steering-state signal indicative of the steering operation state, set the number of times of detection so that the number of times of detection becomes smaller than the first predetermined number over the first predetermined cycle of the PWM period.

Even in the steering operation state, there is a high possibility that the vehicle is in a stopped state during the idle stop. Thus, through prioritization of the reduction of the number of times of detection, the battery power consumption can be reduced.

(k) In the power steering device according to Item (1), the current feedback circuit is configured to, when the steering-signal receiving unit detects change of the steering-state signal from the non-steered state to the steering operation state, perform the feedback correction on the command current value based on the DC bus current value detected by the current detecting circuit after the command current value is computed subsequent to the change.

The feedback correction of the command current value is performed on the command current value. Thus, through the feedback correction after the computation of the command current value, the feedback correction can be performed based on the latest DC bus current value. As a result, the deterioration of the steering feel at the start of steering can be suppressed.

(l) In the power steering device according to Item (4), the current detection number setting circuit is configured to extend time of the PWM period so that the number of times of detection becomes smaller than the first predetermined number over the first predetermined time.

Through extension of the time of the PWM period, the number of times of detection within the predetermined time can be changed without changing the number of times of detection over the predetermined PWM period.

(m) In the power steering device according to Item (6), the control device includes a voltage monitor configured to detect voltage values of the u-phase, the v-phase, and the w-phase.

Through provision of the voltage monitor configured to detect the voltages of the u-, the v-, and the w-phases, a simple abnormality determination can be performed based on the detected voltage values.

(n) In the power steering device according to Item (m), the control device is configured to determine occurrence of a device abnormality when each of potential differences between the voltage values of the u-phase, the v-phase, and the w-phase, which are detected by the voltage monitor, is equal to or larger than a predetermined potential difference.

When it is detected that the potential differences are generated between the u-, the v-, and the w-phases, specifically, the current flows although the command current value is zero, the device abnormality is determined.

(o) In the power steering device according to Item (m), the control device includes an offset potential learning circuit configured to learn potential differences between the u-phase, the v-phase, and the w-phase detected by the voltage monitor when the command current value is zero, and the PWM control unit is configured to correct the PWM duty signals respectively to the u-phase, the v-phase, and the w-phase so as not to generate the potential differences between the u-phase, the v-phase, and the w-phase, based on the potential differences learned by the offset potential learning circuit.

There is a risk in that the voltage monitor and the bridge circuit and the like may contain a product error which may lead to a resistance value error between the u-, v-, and w-phases. As a result, the potential differences are generated between the u-, v-, and w-phases. However, the potential differences are generated not due to an abnormality in the device but due to the resistance value error. Thus, through cancellation of the resistance value error through learning, abnormality detection accuracy can be enhanced.

(p) In the power steering device according to Item (6), the control device is configured to detect an abnormality in the PWM duty values fixed to the predetermined duty value, based on the DC bus current value.

When the steering is not performed, the DC bus current normally become zero. Therefore, through determination of whether or not the DC bus current value is zero at this time, the device abnormality can be detected.

(q) In the power steering device according to Item (p), the control device includes a filter circuit, and the control device is configured to detect the abnormality in the PWM duty values fixed to the predetermined duty value, based on the DC bus current value after passing through the filter circuit.

The DC bus current value that has passed through the filter is smoothed in fluctuation of noise or a value in a short period. Thus, when the value after the passage through the filter is approximately zero, it is determined that the PWM duty values fixed to the predetermined duty value are reliable.

(r) In the power steering device according to Item (6), the control device is configured to detect a device abnormality based on the PWM duty signals immediately before or immediately after switching between the ON timings and the OFF timings of the PWM duty signals.

When a state in which the PWM duty signal becomes longer or shorter than a normal duty is detected, the detection is performed immediately before or immediately after the switching between the ON timing and the OFF timing of the PWM duty signal. As a result, the detection with the highest accuracy can be performed.

According to the embodiments described above, the power consumption can be reduced.

REFERENCE SIGNS LIST 1 steering mechanism, 2 steering wheel, 3 front wheel (steered wheel), 11 three-phase brushless motor, 16 EPS assist controller (control device), 21a FET (switching circuit), 22 three-phase bridge circuit (bridge circuit), 26 DC bus, 27 shunt resistor (current sensor), 30 motor controller (control device), 31 current detecting unit (phase-current computing unit), 31b current detection, number setting circuit, 32 current control unit (current feedback circuit), 33a pulse shift control circuit, 34 PWM control unit, 37 current-command computing unit (command current computing unit), 38 steering signal receiving unit, 42 motor driving circuit (control device)

The invention claimed is:

1. A power steering device, comprising:
a steering mechanism configured to steer steered wheels in accordance with a steering operation of a steering wheel;
a three-phase brushless motor configured to apply a steering force to the steering mechanism;

a control device configured to control drive of the three-phase brushless motor;

a command current computing unit provided in the control device, and configured to compute a command current value to the three-phase brushless motor based on an operating state of a vehicle;

a PWM control unit provided in the control device, and configured to output PWM duty signals respectively to a u-phase, a v-phase, and a w-phase of the three-phase brushless motor in accordance with the command current value;

a bridge circuit provided in the control device, the bridge circuit being constructed of a switching circuit whose drive is to be controlled by the PWM duty signals and being configured to control the drive of the three-phase brushless motor;

a current sensor provided to a DC bus connected to the bridge circuit, and configured to detect a DC bus current value flowing through the DC bus;

a current detecting circuit provided in the control device, and configured to detect, through the current sensor, the DC bus current value when, among the PWM duty signals to the u-phase, the v-phase, and the w-phase of the three-phase brushless motor, the PWM duty signal of a maximum phase with longest energization time is ON and the PWM duty signal of a minimum phase with shortest energization time and the PWM duty signal of an intermediate phase are OFF, and the DC bus current value when, among the PWM duty signals to the u-phase, the v-phase, and the w-phase of the three-phase brushless motor, the PWM duty signal of the maximum phase is ON and the PWM duty signal of the intermediate phase is ON;

a phase-current computing unit configured to estimate current values of the u-phase, the v-phase, and the w-phase based on the DC bus current value detected by the current sensor;

a current feedback circuit provided in the control device, and configured to perform feedback correction on the command current value based on the current values of the u-phase, the v-phase, and the w-phase, which are estimated by the phase-current computing unit;

a pulse shift control circuit provided in the control device, and configured to correct a phase of an ON timing of the PWM duty signal of the maximum phase or the intermediate phase so that a difference between an ON timing of the PWM duty signal of the maximum phase and an ON timing of the PWM duty signal of the intermediate phase becomes equal to or larger than a second predetermined value larger than a first predetermined value when the difference between the ON timing of the PWM duty signal of the maximum phase and the ON timing of the PWM duty signal of the intermediate phase becomes smaller than the first predetermined value, and to correct a phase of the PWM duty signal of the intermediate phase or the minimum phase so that a difference between the ON timing of the PWM duty signal of the intermediate phase and an ON timing of the PWM duty signal of the minimum phase becomes equal to or larger than the second predetermined value when the difference between the ON timing of the PWM duty signal of the intermediate phase and the ON timing of the PWM duty signal of the minimum phase becomes smaller than the first predetermined value;

a steering-signal receiving unit provided in the control circuit, and configured to receive a steering-state signal of the steering wheel; and a current detection number setting circuit provided in the control device, and configured to set a number of times of detection of the DC bus current value by the current detecting circuit to a first predetermined number over a first predetermined cycle of a PWM period when the steering-signal receiving unit receives the steering-state signal indicative of a steering operation state, and to set the number of times of detection so that the number of times of detection becomes smaller than the first predetermined number over the first predetermined cycle of the PWM period when the steering-signal receiving unit receives the steering-state signal indicative of a non-steered state.

2. The power steering device according to claim 1, wherein the pulse shift control circuit is configured to perform the pulse shift control when the detection of the DC bus current value is executed by the current detecting circuit.

3. The power steering device according to claim 2, wherein the pulse shift control circuit is configured to avoid performing the pulse shift control when the detection of the DC bus current value is not executed by the current detecting circuit.

4. The power steering device according to claim 2, wherein the current feedback circuit is configured to, when the steering-state signal changes from the non-steered state to the steering operation state, perform the feedback control on the command current value by using a latest value of the DC bus current value detected by the current detecting circuit.

5. The power steering device according to claim 1,
wherein the control device comprises a vehicle-speed receiving unit configured to receive a vehicle-speed signal, and
wherein the current detection number setting circuit is configured to change the number of times of detection in accordance with the vehicle-speed signal.

6. The power steering device according to claim 5, wherein the current detection number setting circuit is configured to change the number of times of detection so that the number of times of detection becomes smaller as the vehicle-speed signal represents a lower vehicle speed.

7. The power steering device according to claim 6, wherein the current detection number setting circuit is configured to set the number of times of detection smaller than the first predetermined number when the vehicle-speed signal represents 0 km/h.

8. The power steering device according to claim 5, wherein the current detection number setting circuit is configured to set the number of times of detection smaller than the first predetermined number when the vehicle-speed signal represents a speed lower than a first predetermined vehicle speed and when the vehicle-speed signal represents a speed higher than a second predetermined vehicle speed higher than the first predetermined vehicle speed.

9. The power steering device according to claim 1, wherein the current detection number setting circuit is configured to set the number of times of detection so that the number of times of detection becomes smaller than the first predetermined number over the first predetermined cycle of the PWM period when the steering-signal receiving unit receives the steering-state signal indicative of the non-steered state continuously for predetermined time, and to set the number of times of detection to the first predetermined number over the first predetermined cycle of the PWM period when the steering-signal receiving unit receives the steering-state signal indicative of the steering operation state.

10. The power steering device according to claim 9,
wherein the current detection number setting circuit comprises a steering-state determining circuit configured to determine whether the steering wheel is in the steering operation state or a non-steered state, and is configured to set the number of times of detection to the first predetermined number over the first predetermined cycle of the PWM period when the steering-state determining circuit determines the steering operation state based on the steering-state signal, and to set the number of times of detection so that the number of times of detection becomes smaller than the first predetermined number over the first predetermined cycle of the PWM period when the steering-state determining circuit determines the non-steered state, and wherein the steering-state determining circuit is configured to determine that the steering wheel is in the non-steered state, based on a steering torque value generated in the steering mechanism or the command current value.

11. The power steering device according to claim 9,
wherein the current detection number setting circuit comprises a steering-state determining circuit configured to determine whether the steering wheel is in the steering operation state or a non-steered state, and is configured to set the number of times of detection to the first predetermined number over the first predetermined cycle of the PWM period when the steering-state determining circuit determines the steering operation state based on the steering-state signal, and to set the number of times of detection so that the number of times of detection becomes smaller than the first predetermined number over the first predetermined cycle of the PWM period when the steering-state determining circuit determines the non-steered state, and wherein the steering-state determining circuit is configured to determine that the steering wheel is in the steering operation state, based on a steering torque value generated in the steering mechanism.

12. The power steering device according to claim 1,
wherein the control device comprises an idle-stop signal receiving unit configured to receive an idle stop signal indicating that the vehicle is in an idle stop state, and
wherein the current detection number setting circuit is configured to set the number of times of detection so that the number of times of detection becomes smaller than the first predetermined number over the first predetermined cycle of the PWM period when the idle-stop signal receiving unit receives the idle stop signal.

13. The power steering device according to claim 12,
wherein the current detection number setting circuit is configured to, when the idle-stop signal receiving unit receives the idle stop signal and the steering-signal receiving unit receives the steering-state signal indicative of the steering operation state, set the number of times of detection so that the number of times of detection becomes smaller than the first predetermined number over the first predetermined cycle of the PWM period.

14. The power steering device according to claim 1,
wherein the current feedback circuit is configured to, when the steering-signal receiving unit detects change of the steering-state signal from the non-steered state to the steering operation state, perform the feedback correction on the command current value based on the DC bus current value detected by the current detecting circuit after the command current value is computed subsequent to the change.

15. A power steering device, comprising:
a steering mechanism configured to steer steered wheels in accordance with a steering operation of a steering wheel;
a three-phase brushless motor configured to apply a steering force to the steering mechanism;
a control device configured to control drive of the three-phase brushless motor;
a command current computing unit provided in the control device, and configured to compute a command current value to the three-phase brushless motor based on an operating state of a vehicle;
a PWM control unit provided in the control device, and configured to output PWM duty signals respectively to a u-phase, a v-phase, and a w-phase of the three-phase brushless motor in accordance with the command current value;
a bridge circuit provided in the control device, the bridge circuit being constructed of a switching circuit whose drive is to be controlled by the PWM duty signals and being configured to control the drive of the three-phase brushless motor;
a current sensor provided to a DC bus connected to the bridge circuit, and configured to detect a DC bus current value flowing through the DC bus;
a current detecting circuit provided in the control device, and configured to detect, through the current sensor, the DC bus current value when, among the PWM duty signals to the u-phase, the v-phase, and the w-phase of the three-phase brushless motor, the PWM duty signal of a maximum phase with longest energization time is ON and the PWM duty signal of a minimum phase with shortest energization time and the PWM duty signal of an intermediate phase are OFF, and the DC bus current value when, among the PWM duty signals to the u-phase, the v-phase, and the w-phase of the three-phase brushless motor, the PWM duty signal of the maximum phase is ON and the PWM duty signal of the intermediate phase is ON;
a phase-current computing unit configured to estimate current values of the u-phase, the v-phase, and the w-phase based on the DC bus current value detected by the current sensor;
a current feedback circuit provided in the control device, and configured to perform feedback correction on the command current value based on the current values of the u-phase, the v-phase, and the w-phase, which are estimated by the phase-current computing unit;
a pulse shift control circuit provided in the control device, and configured to correct a phase of an ON timing of the PWM duty signal of the maximum phase or the intermediate phase so that a difference between an ON timing of the PWM duty signal of the maximum phase and an ON timing of the PWM duty signal of the intermediate phase becomes equal to or larger than a second predetermined value larger than a first predetermined value when the difference between the ON timing of the PWM duty signal of the maximum phase and the ON timing of the PWM duty signal of the intermediate phase becomes smaller than the first predetermined value, and to correct a phase of the PWM duty signal of the intermediate phase or the minimum phase so that a difference between the ON timing of the PWM duty signal of the intermediate phase and an ON timing of the PWM duty signal of the minimum phase becomes equal to or larger than the second predetermined value when the difference between the ON timing of the PWM duty signal of the intermediate phase and the ON timing of the PWM duty signal of the minimum phase becomes smaller than the first predetermined value;

a steering-signal receiving unit provided in the control circuit, and configured to receive a steering-state signal of the steering wheel; and a current detection number setting circuit provided in the control device, and configured to set a number of times of detection of the DC bus current value by the current detecting circuit to a first predetermined number over a first predetermined time when the steering-signal receiving unit receives the steering-state signal indicative of a steering operation state, and to set the number of times of detection so that the number of times of detection becomes smaller than the first predetermined number over the first predetermined time when the steering-signal receiving unit receives the steering-state signal indicative of a non-steered state.

16. The power steering device according to claim 15, wherein the current detection number setting circuit is configured to extend time of the PWM period so that the number of times of detection becomes smaller than the first predetermined number over the first predetermined time.

17. A power steering device, comprising:
a steering mechanism configured to steer steered wheels in accordance with a steering operation of a steering wheel;
a three-phase brushless motor configured to apply a steering force to the steering mechanism;
a control device configured to control drive of the three-phase brushless motor;
a command current computing unit provided in the control device, and configured to compute a command current value to the three-phase brushless motor based on an operating state of a vehicle;
a PWM control unit provided in the control device, and configured to output PWM duty signals respectively to a u-phase, a v-phase, and a w-phase of the three-phase brushless motor in accordance with the command current value;
a bridge circuit provided in the control device, the bridge circuit being constructed of a switching circuit whose drive is to be controlled by the PWM duty signals and being configured to control the drive of the three-phase brushless motor;
a current sensor provided to a DC bus connected to the bridge circuit, and configured to detect a DC bus current value flowing through the DC bus;
a current detecting circuit provided in the control device, and configured to detect, through the current sensor, the DC bus current value when, among the PWM duty signals to the u-phase, the v-phase, and the w-phase of the three-phase brushless motor, the PWM duty signal of a maximum phase with longest energization time is ON and the PWM duty signal of a minimum phase with shortest energization time and the PWM duty signal of an intermediate phase are OFF, and the DC bus current value when, among the PWM duty signals to the u-phase, the v-phase, and the w-phase of the three-phase brushless motor, the PWM duty signal of the maximum phase is ON and the PWM duty signal of the intermediate phase is ON;

a phase-current computing unit configured to estimate current values of the u-phase, the v-phase, and the w-phase based on the DC bus current value detected by the current sensor;

a current feedback circuit provided in the control device, and configured to perform feedback correction on the command current value based on the current values of the u-phase, the v-phase, and the w-phase, which are estimated by the phase-current computing unit;

a pulse shift control circuit provided in the control device, and configured to correct a phase of an ON timing of the PWM duty signal of the maximum phase or the intermediate phase so that a difference between an ON timing of the PWM duty signal of the maximum phase and an ON timing of the PWM duty signal of the intermediate phase becomes equal to or larger than a second predetermined value larger than a first predetermined value when the difference between the ON timing of the PWM duty signal of the maximum phase and the ON timing of the PWM duty signal of the intermediate phase becomes smaller than the first predetermined value, and to correct a phase of the PWM duty signal of the intermediate phase or the minimum phase so that a difference between the ON timing of the PWM duty signal of the intermediate phase and an ON timing of the PWM duty signal of the minimum phase becomes equal to or larger than the second predetermined value when the difference between the ON timing of the PWM duty signal of the intermediate phase and the ON timing of the PWM duty signal of the minimum phase becomes smaller than the first predetermined value;

a steering-signal receiving unit provided in the control circuit, and configured to receive a steering-state signal of the steering wheel; and a current detection number setting circuit provided in the control device, and configured to set a number of times of detection of the DC bus current value by the current detecting circuit to a first predetermined number over a first predetermined time when the steering-signal receiving unit receives the steering-state signal indicative of a steering operation state, and to set the number of times of detection to zero when the steering-signal receiving unit receives the steering-state signal indicative of a non-steered state.

18. The power steering device according to claim 17, wherein the PWM control unit is configured to, when the steering-signal receiving unit receives the steering-state signal indicative of the non-steered state, fix PWM duty values corresponding to the PWM duty signals to a predetermined duty value.

19. The power steering device according to claim 18, wherein the control device comprises a voltage monitor configured to detect voltage values of the u-phase, the v-phase, and the w-phase.

20. The power steering device according to claim 19, wherein the control device is configured to determine occurrence of a device abnormality when each of potential differences between the voltage values of the u-phase, the v-phase, and the w-phase, which are detected by the voltage monitor, is equal to or larger than a predetermined potential difference.

21. The power steering device according to claim 19, wherein the control device comprises an offset potential learning circuit configured to learn potential differences between the u-phase, the v-phase, and the w-phase detected by the voltage monitor when the command current value is zero, and wherein the PWM control unit is configured to correct the PWM duty signals respectively to the u-phase, the v-phase, and the w-phase so as not to generate the potential differences between the u-phase, the v-phase, and the w-phase, based on the potential differences learned by the offset potential learning circuit.

22. The power steering device according to claim 18, wherein the control device is configured to detect an abnormality in the PWM duty values fixed to the predetermined duty value, based on the DC bus current value.

23. The power steering device according to claim 22,
wherein the control device comprises a filter circuit, and
wherein the control device is configured to detect the abnormality in the PWM duty values fixed to the predetermined duty value based on the DC bus current value after passing through the filter circuit.

24. The power steering device according to claim 18, wherein the control device is configured to detect a device abnormality based on the PWM duty signals immediately before or immediately after switching between the ON timings and the OFF timings of the PWM duty signals.

25. A control device for a power steering device, configured to control drive of a three-phase brushless motor configured to apply a steering force to a steering mechanism, the control device comprising:
a command current computing unit configured to compute a command current value to the three-phase brushless motor based on an operating state of a vehicle;
a PWM control unit configured to output PWM duty signals respectively to a u-phase, a v-phase, and a w-phase of the three-phase brushless motor in accordance with the command current value;
a bridge circuit constructed of a switching circuit whose drive is to be controlled by the PWM duty signals, and configured to control the drive of the three-phase brushless motor;
a current sensor provided to a DC bus connected to the bridge circuit, and configured to detect a DC bus current value flowing through the DC bus;
a current detecting circuit configured to detect, through the current sensor, the DC bus current value when, among the PWM duty signals to the u-phase, the v-phase, and the w-phase of the three-phase brushless motor, the PWM duty signal of a maximum phase with longest energization time is ON and the PWM duty signal of a minimum phase with shortest energization time and the PWM duty signal of an intermediate phase are OFF, and the DC bus current value when, among the PWM duty signals to the u-phase, the v-phase, and the w-phase of the three-phase brushless motor, the PWM duty signal of the maximum phase is ON and the PWM duty signal of the intermediate phase is ON;
a phase-current computing unit configured to estimate current values of the u-phase, the v-phase, and the w-phase based on the DC bus current value detected by the current sensor;
a current feedback circuit configured to perform feedback correction on the command current value based on the current values of the u-phase, the v-phase, and the w-phase, which are estimated by the phase-current computing unit;
a pulse shift control circuit configured to correct a phase of an ON timing of the PWM duty signal of the maximum phase or the intermediate phase so that a difference between an ON timing of the PWM duty signal of the maximum phase and an ON timing of the PWM duty signal of the intermediate phase becomes equal to or larger than a second predetermined value larger than a first predetermined value when the difference between the ON timing of the PWM duty signal of the maximum phase and the ON timing of the PWM duty signal of the intermediate phase becomes smaller than the first predetermined value, and to correct a phase of the PWM duty signal of the intermediate phase or the minimum phase so that a difference between the ON timing of the PWM duty signal of the intermediate phase and an ON timing of the PWM duty signal of the minimum phase becomes equal to or larger than the second predetermined value when the difference between the ON timing of the PWM duty signal of the intermediate phase and the ON timing of the PWM duty signal of the minimum phase becomes smaller than the first predetermined value;
a steering-signal receiving unit configured to receive a steering-state signal of the steering wheel; and
a current detection number setting circuit provided in the control device, and configured to set a number of times of detection of the DC bus current value by the current detecting circuit to a first predetermined number over a first predetermined cycle of a PWM period when the steering-signal receiving unit receives the steering-state signal indicative of a steering operation state, and to set the number of times of detection so that the number of times of detection becomes smaller than the first predetermined number over the first predetermined cycle of the PWM period when the steering-signal receiving unit receives the steering-state signal indicative of a non-steered state.

26. A control device for a power steering device, configured to control drive of a three-phase brushless motor configured to apply a steering force to a steering mechanism, the control device comprising:
a command current computing unit configured to compute a command current value to the three-phase brushless motor based on an operating state of a vehicle;
a PWM control unit configured to output PWM duty signals respectively to a u-phase, a v-phase, and a w-phase of the three-phase brushless motor in accordance with the command current value;
a bridge circuit constructed of a switching circuit whose drive is to be controlled by the PWM duty signals, and configured to control the drive of the three-phase brushless motor;
a current sensor provided to a DC bus connected to the bridge circuit, and configured to detect a DC bus current value flowing through the DC bus;
a current detecting circuit configured to detect, through the current sensor, the DC bus current value when, among the PWM duty signals to the u-phase, the v-phase, and the w-phase of the three-phase brushless motor, the PWM duty signal of a maximum phase with longest energization time is ON and the PWM duty signal of a minimum phase with shortest energization time and the PWM duty signal of an intermediate phase are OFF, and the DC bus current value when, among the PWM duty signals to the u-phase, the v-phase, and the w-phase of the three-phase brushless motor, the PWM duty signal of the maximum phase is ON and the PWM duty signal of the intermediate phase is ON;

a phase-current computing unit configured to estimate current values of the u-phase, the v-phase, and the w-phase based on the DC bus current value detected by the current sensor;

a current feedback circuit configured to perform feedback correction on the command current value based on the current values of the u-phase, the v-phase, and the w-phase, which are estimated by the phase-current computing unit;

a pulse shift control circuit configured to correct a phase of an ON timing of the PWM duty signal of the maximum phase or the intermediate phase so that a difference between an ON timing of the PWM duty signal of the maximum phase and an ON timing of the PWM duty signal of the intermediate phase becomes equal to or larger than a second predetermined value larger than a first predetermined value when the difference between the ON timing of the PWM duty signal of the maximum phase and the ON timing of the PWM duty signal of the intermediate phase becomes smaller than the first predetermined value, and to correct a phase of the PWM duty signal of the intermediate phase or the minimum phase so that a difference between the ON timing of the PWM duty signal of the intermediate phase and an ON timing of the PWM duty signal of the minimum phase becomes equal to or larger than the second predetermined value when the difference between the ON timing of the PWM duty signal of the intermediate phase and the ON timing of the PWM duty signal of the minimum phase becomes smaller than the first predetermined value;

a steering-signal receiving unit configured to receive a steering-state signal of the steering wheel; and a current detection number setting circuit provided in the control device, and configured to set a number of times of detection of the DC bus current value by the current detecting circuit to a first predetermined number over a first predetermined time when the steering-signal receiving unit receives the steering-state signal indicative of a steering operation state, and to set the number of times of detection so that the number of times of detection becomes smaller than the first predetermined number over the first predetermined time when the steering-signal receiving unit receives the steering-state signal indicative of a non-steered state.

* * * * *